(12) United States Patent
Stuhler et al.

(10) Patent No.: US 9,675,933 B2
(45) Date of Patent: Jun. 13, 2017

(54) EMISSIONS CONTAMINANT CAPTURE AND COLLECTION DEVICE AND METHOD OF USE

(71) Applicant: Chemical and Metal Technologies LLC, Tuscaloosa, AL (US)

(72) Inventors: Hal Stuhler, Allenwood, NJ (US); Lori Stuhler, Allenwood, NJ (US); Van T. Walworth, Lebanon, TN (US)

(73) Assignee: Chemical and Metal Technologies, LLC, Tuscaloosa, AL (US)

( * ) Notice: Subject to any disclaimer, the term of this patent is extended or adjusted under 35 U.S.C. 154(b) by 13 days.

(21) Appl. No.: 14/808,563

(22) Filed: Jul. 24, 2015

(65) Prior Publication Data

US 2016/0023160 A1   Jan. 28, 2016

Related U.S. Application Data

(60) Provisional application No. 62/029,041, filed on Jul. 25, 2014, provisional application No. 62/133,791, filed on Mar. 16, 2015.

(51) Int. Cl.
*B01D 53/82* (2006.01)
*B01D 45/08* (2006.01)
(Continued)

(52) U.S. Cl.
CPC ......... *B01D 53/82* (2013.01); *B01D 46/0036* (2013.01); *B01D 53/1481* (2013.01);
(Continued)

(58) Field of Classification Search
CPC .. B01D 45/08; B01D 2257/602; B01D 53/82; B01D 53/64; B01D 2258/0283;
(Continued)

(56) References Cited

U.S. PATENT DOCUMENTS 4,381,288 A * 4/1983 Weiss .................. C01G 13/00
                                                    210/901
5,885,076 A * 3/1999 Ralls .................. A61C 17/046
                                                    210/532.1
(Continued)

FOREIGN PATENT DOCUMENTS

DE    2948305 A1 *  6/1981  ............. B01D 53/64
DE    4217987 A1 * 12/1993  ............... A62D 3/13
(Continued)

OTHER PUBLICATIONS

International Search Report and Written Opinion for PCT/US2015/042067 mailed Oct. 26, 2015.

*Primary Examiner* — Timothy Vanoy
(74) *Attorney, Agent, or Firm* — Harness, Dickey & Pierce, P.L.C.

(57) ABSTRACT

An apparatus for removing contaminants from emissions is provided with a housing shaped as a reverse venturi. The housing includes an entry portion for receiving emissions, an exit portion for expelling emissions, and an enlarged portion disposed therebetween for trapping the contaminants in the emissions. A mass of reactive material is disposed within the enlarged portion and has a reactive outer surface disposed in contact with the emissions. The mass of reactive material contains an amalgam forming metal at the reactive outer surface that chemically binds with the emissions that are passing through the enlarged portion of the housing. Emissions control methods for removing contaminants from gaseous and non-gaseous emissions are also provided. One of the emissions control methods includes passing the gaseous emissions through the reverse venturi apparatus described herein. Another one of the emissions control methods includes treating non-gaseous emissions in a treatment tank containing a sorbent.

32 Claims, 25 Drawing Sheets

(51) Int. Cl.
| | | |
|---|---|---|
| *B01D 53/64* | (2006.01) | |
| *B01D 53/83* | (2006.01) | |
| *B01D 46/00* | (2006.01) | |
| *B01D 53/38* | (2006.01) | |
| *B01D 53/75* | (2006.01) | |
| *B01D 21/00* | (2006.01) | |
| *C02F 1/26* | (2006.01) | |
| *C02F 1/28* | (2006.01) | |
| *C02F 1/52* | (2006.01) | |
| *C02F 1/62* | (2006.01) | |
| *B01D 53/14* | (2006.01) | |
| *B01D 53/32* | (2006.01) | |
| *B01D 50/00* | (2006.01) | |

(52) U.S. Cl.
CPC ........... *B01D 53/323* (2013.01); *B01D 53/38* (2013.01); *B01D 53/64* (2013.01); *B01D 53/75* (2013.01); *B01D 53/83* (2013.01); *B01D 45/08* (2013.01); *B01D 50/002* (2013.01); *B01D 2257/602* (2013.01); *B01D 2258/0283* (2013.01)

(58) Field of Classification Search
CPC .. B01D 53/83; B01D 53/1481; B01D 50/002; B01D 46/0036; B01D 53/38; B01D 53/75; B01D 53/323; B01D 21/00; C02F 2001/007; C02F 1/26; C02F 1/28; C02F 1/281; C02F 1/5236; C02F 1/5245; C02F 1/62
See application file for complete search history.

(56) References Cited

U.S. PATENT DOCUMENTS

| | | | |
|---|---|---|---|
| 5,944,196 A * | 8/1999 | Oram ..................... | B03B 5/623 209/158 |
| 6,136,072 A | 10/2000 | Sjostrom et al. | |
| 6,451,094 B1 | 9/2002 | Chang et al. | |
| 6,558,454 B1 | 5/2003 | Chang et al. | |
| 6,695,894 B2 | 2/2004 | Chang et al. | |
| 6,699,440 B1 * | 3/2004 | Vermeulen ............. | B01D 53/64 422/170 |
| 6,712,878 B2 | 3/2004 | Chang et al. | |
| 6,905,534 B2 | 6/2005 | Chang et al. | |
| 7,033,419 B1 * | 4/2006 | Granite ................. | B01D 53/64 423/210 |
| 7,141,091 B2 | 11/2006 | Chang | |
| 7,214,254 B2 | 5/2007 | Tranquilla | |
| 7,275,644 B2 | 10/2007 | Ness et al. | |
| 7,306,774 B2 | 12/2007 | DeBerry | |
| 7,494,632 B1 | 2/2009 | Klunder | |
| 7,540,384 B2 | 6/2009 | Ness et al. | |
| 7,575,629 B2 | 8/2009 | Yang et al. | |
| 7,578,869 B2 | 8/2009 | Yang et al. | |
| 7,618,603 B2 | 11/2009 | Seames et al. | |
| 7,704,920 B2 | 4/2010 | Yang et al. | |
| 7,731,781 B2 | 6/2010 | Berry et al. | |
| 7,753,992 B2 | 7/2010 | Yang et al. | |
| 7,850,764 B2 | 12/2010 | DeBerry | |
| 7,854,910 B1 | 12/2010 | Schofield | |
| 7,901,585 B1 * | 3/2011 | Lehtinen ................ | B01D 15/00 210/660 |
| 7,987,613 B2 | 8/2011 | Ness et al. | |
| 8,029,600 B2 | 10/2011 | Chang | |
| 8,062,410 B2 | 11/2011 | Bullinger et al. | |
| 8,241,398 B2 | 8/2012 | Berry et al. | |
| 8,480,791 B2 | 7/2013 | Yang et al. | |
| 8,523,963 B2 | 9/2013 | Bullinger et al. | |
| 8,579,999 B2 | 11/2013 | Bullinger et al. | |
| 8,651,282 B2 | 2/2014 | Ness et al. | |
| 8,685,351 B2 | 4/2014 | Yang et al. | |
| 8,721,777 B2 | 5/2014 | Velpari et al. | |
| 8,728,217 B2 | 5/2014 | Velpari et al. | |
| 8,728,974 B2 | 5/2014 | Yang et al. | |
| 8,747,676 B2 | 6/2014 | Hughes et al. | |
| 2005/0026097 A1 | 2/2005 | Penfornis et al. | |
| 2005/0028672 A1 * | 2/2005 | Hickerson .......... | B01D 53/0415 95/90 |
| 2005/0132880 A1 * | 6/2005 | Chang .................... | B03C 3/013 95/63 |
| 2006/0120935 A1 * | 6/2006 | Stuhler .................. | B01D 53/64 423/210 |
| 2008/0209898 A1 * | 9/2008 | Succi ..................... | B01D 45/08 60/311 |
| 2010/0251942 A1 | 10/2010 | O'Boyle | |
| 2012/0131973 A1 * | 5/2012 | Greenidge ............. | B01D 53/62 71/63 |
| 2015/0044116 A1 * | 2/2015 | Suchak ................... | F01N 3/04 423/235 |

FOREIGN PATENT DOCUMENTS

| | | | | |
|---|---|---|---|---|
| DE | 10 2014 212 173 A1 * | 1/2016 | .......... | H01M 2/1264 |
| EP | 0247965 A1 * | 12/1987 | ............ | B01D 45/08 |
| FR | 2044151 A5 * | 2/1971 | ............ | B01D 45/08 |
| GB | 1156711 A * | 7/1969 | ............. | B01D 45/08 |
| WO | WO 0062906 A1 * | 10/2000 | ............. | B01D 53/64 |

* cited by examiner

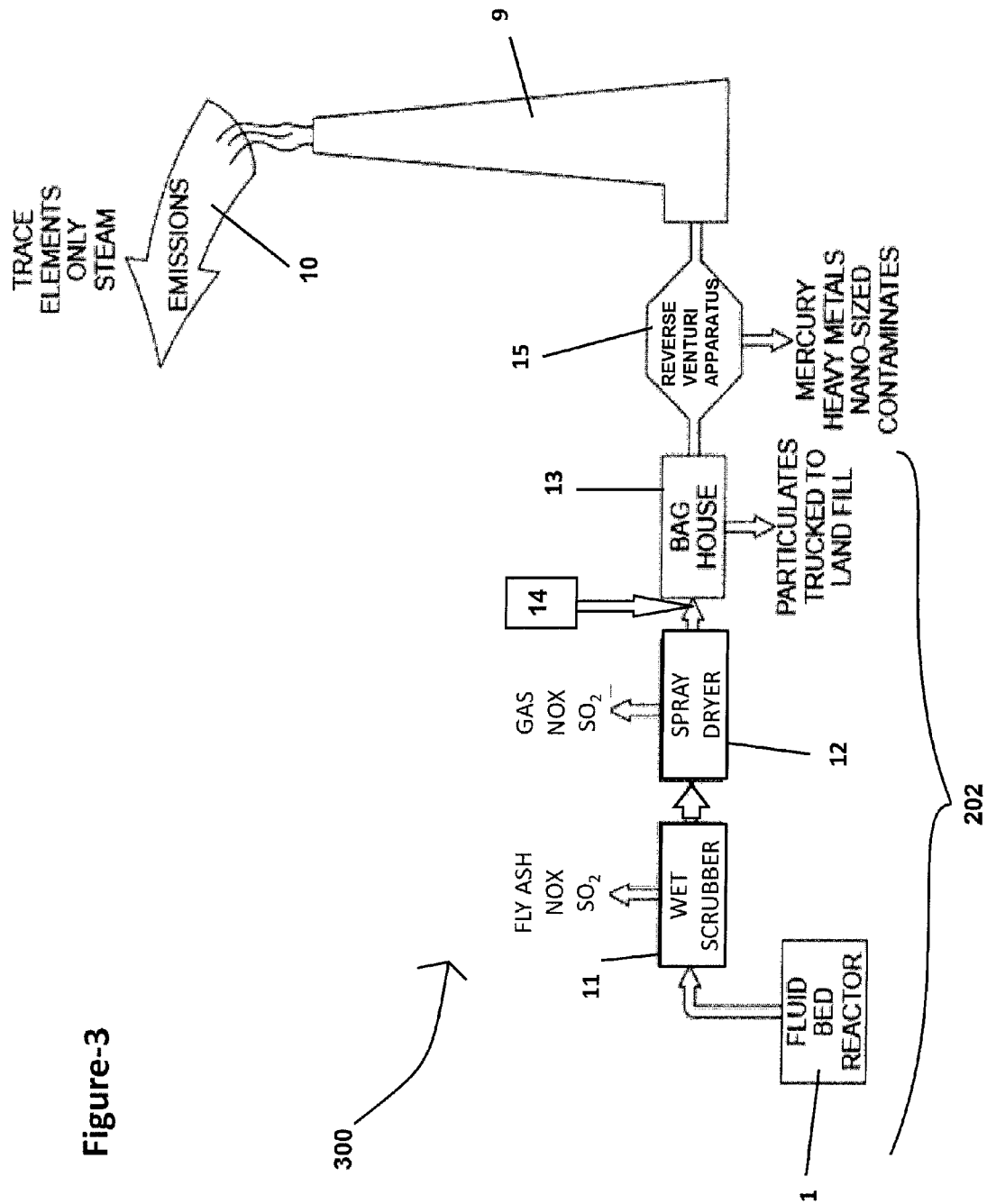

Figure-4B
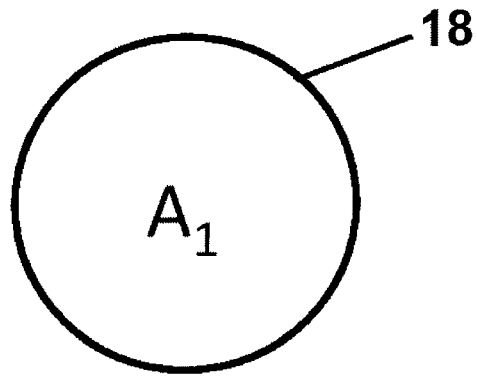
Figure-4C
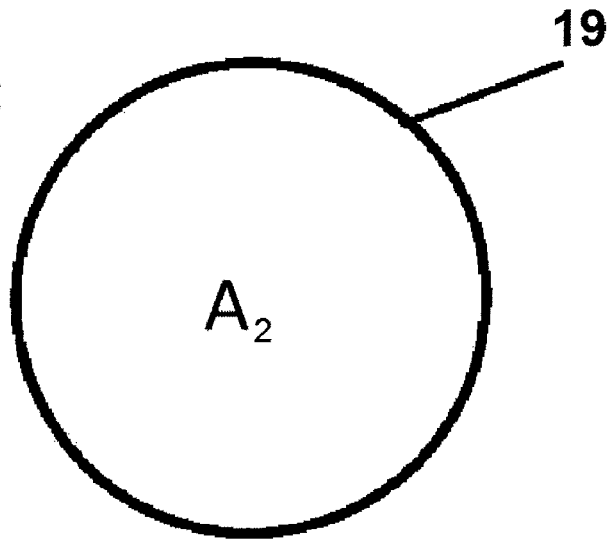
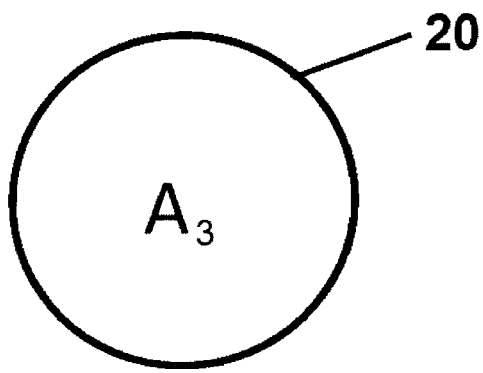
Figure-4D

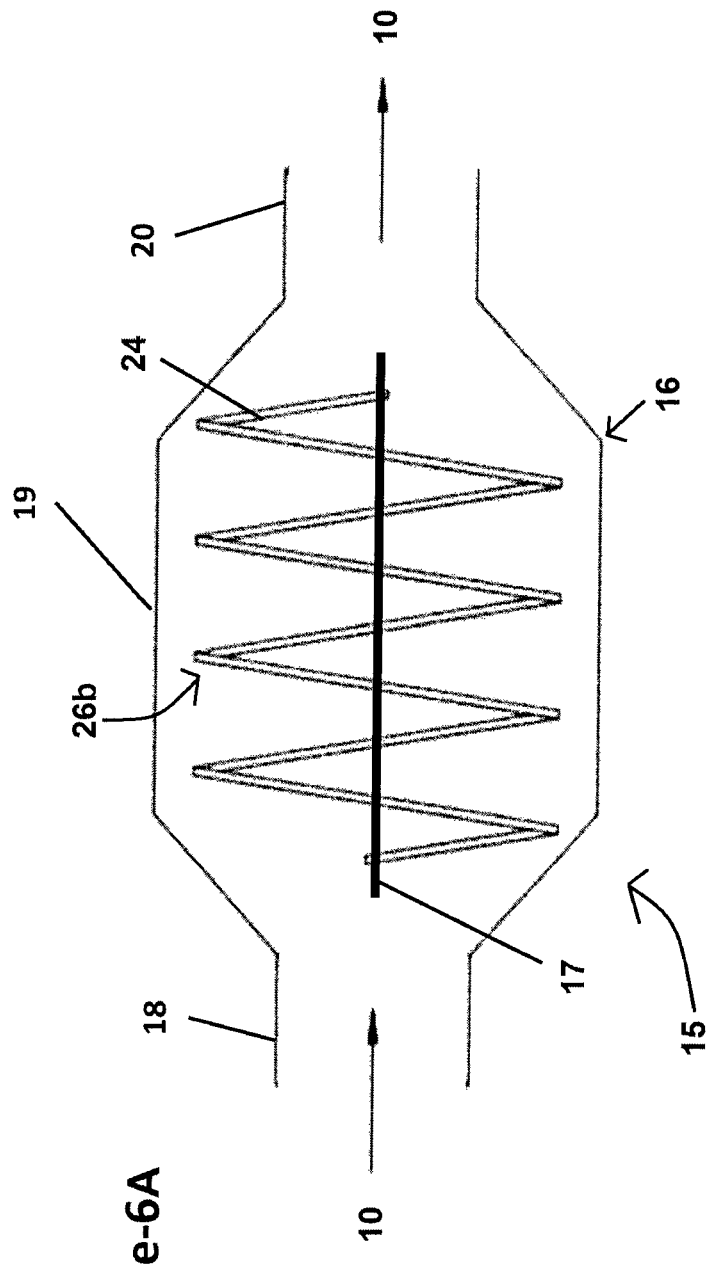

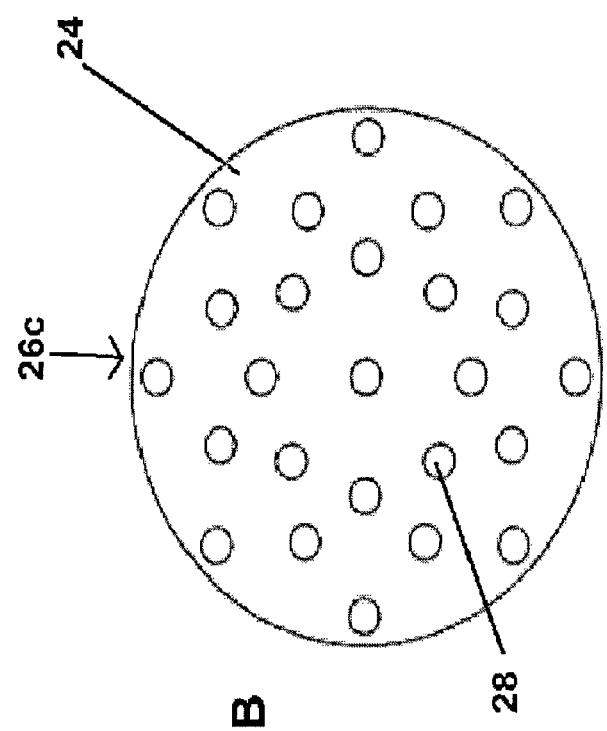

EMISSIONS CONTAMINANT CAPTURE AND COLLECTION DEVICE AND METHOD OF USE

CROSS-REFERENCE TO RELATED APPLICATIONS

This application claims the benefit of U.S. Provisional Application No. 62/029,041, filed Jul. 25, 2014 and U.S. Provisional Application No. 62/133,791, filed Mar. 16, 2015. The entire disclosures of the above applications are incorporated herein by reference.

FIELD

The subject disclosure generally relates to industrial emissions control systems and methods, the devices used in such systems, and methods to remove contaminants from gaseous and non-gaseous emissions.

BACKGROUND

This section provides background information related to the present disclosure and is not necessarily prior art.

Many industries from numerous sectors of the economy have emissions of one kind or another. Such emissions can be separated into two basic groups, one being gaseous and the other being non-gaseous. It is common for emissions in the gaseous group and emissions in the non-gaseous group to contain hazardous contaminants. Emissions in the gaseous group may be in the form of exhaust gases generated by a coal fired plant or from a natural gas burning facility. Emissions in the non-gaseous group may be in the form of liquid-like, sludge-like, or slurry-like substances. If and when the level of hazardous contaminants in emissions meets and/or exceeds allowable limits, the contaminants must either be neutralized, captured, collected, removed, disposed of, and/or properly contained by one means or another.

Many industries rely upon burning a fuel material as a means to accomplish some aspect of their respective process. For instance, in a first example, steel mills burn and/or smelt metal in the process of making metal shapes, extrusions, and other metal castings. The processes used in the metal industry include operations in which particulates are emitted in metallic vapor and ionized metal. Hazardous contaminants to the environment, plants, animals, and/or humans are released into the air via the metallic vapor. To one degree or another, the hazardous contaminants in the metallic vapor and/or the metallic vapor compounds must be collected and disposed of properly. In a second example, the industry of mining precious heavy metals such as gold, silver, and platinum includes metals and metallic vapor emissions containing heavy metal contaminants and particulates that are considered hazardous if not captured, collected, and disposed of properly. In a third example, industries burning natural gas have emissions that often contain elevated levels of contaminants that are considered to be hazardous if not captured, collected, and disposed of properly. In a fourth example, the producers of energy who use coal as a burnable consumable to create steam in boilers for turning generators have considerable emissions containing metallic vapor and metallic compounds that are considered hazardous to the environment, plants, animals, and humans. Among other hazardous contaminants, metallic vapor emissions often contain mercury (Hg).

Because of the pattern of global jet streams, airborne metallic vapor emissions may be carried from one country and deposited in another. For instance, it is possible that much of the emissions of mercury generated in China and/or India may actually end up being deposited in the USA and/or the ocean waters in between. In a similar fashion, much of the mercury laden emissions generated in the USA may actually be deposited in Europe and/or in the ocean waters in between. To complete this circle, much of the mercury laden emissions generated in Europe may actually be deposited in China and/or India. Therefore, the containment of mercury and other hazardous contaminants in emissions generated by industrial processes is a global problem with global implications requiring a global effort to resolve it.

National and international regulations, rules, restrictions, fees, monitoring, and a long line of ever evolving and increasingly stringent laws are proposed and/or enforced upon those generating such emissions. The regulation and/or control over hazardous emissions varies from country to country around the world. However, it is difficult, if not impossible, for one country to enact upon another country a measure of control that endeavors to encourage, much less force, emissions producers to take measures to reduce the hazardous emissions which may be generated in that country, even though those emissions may be deposited in another country.

Japan has been a global leader in the reduction of mercury production and emissions containing mercury since the 1970s. Japan has enacted regulations which have influenced how the larger global community addresses environmental issues specifically related to mercury production. Japan's efforts to promote international mercury legislation leads the way with hopes of preventing mercury based disorders. In addition to Japan, the USA has some of the world's most stringent and restrictive laws and regulations enforced by the U.S. Environmental Protection Agency (EPA). One of the most egregious contaminants in metallic vapor emissions is mercury. The EPA has issued new and revised programs such as "Mercury and Air Toxics Standards" regulating the mercury emissions produced by various utilities across the USA with the goal of reducing the amount of mercury emitted by coal burning plants by 91% by the year 2016. Even though the imposed regulations are an ongoing subject of policy and legal debate, the over-shadowing issue remains that hazardous contaminants must be dealt with.

The jurisdiction for enforcement by the EPA does not apply to producers of hazardous emissions in industrialized nations such as India, China, Europe, and other foreign countries. Therefore, the United Nations (UN) has tried to evoke pressure upon their member nations to reduce emissions of hazardous metallic vapors. Representatives of at least 140 member nations have agreed to reduce global mercury emissions based on a treaty which took effect in 2013. However, while some global improvement has been recognized in some countries, the expansion of emerging industrialized countries seems to be greatly outpacing the improved reduction efforts.

While the primary focus on mercury does not lessen the hazardous effects of the other contaminants in the metallic vapor emissions, mercury is potentially the most prevalent and the most harmful to animals and humans. Mercury is a naturally occurring element present all over the world in plants, soil, and animals. However, human industrial processes have greatly increased the accumulation of mercury and/or mercury deposits in concentrations that are well above naturally occurring levels. On a global basis, it is estimated that the total quantity of mercury released by human-based activities is as much as 1960 metric tons per year. This figure was calculated from data analyzed in 2010. Worldwide, the largest contributors to this particular type of emission are coal burning (24%) and gold mining (37%) activities. In the USA, coal burning accounts for a higher percentage of emissions than gold mining activities.

The primary problem with exposure to mercury for animals and humans is that it is a bioaccumulation substance. Therefore, any amount of mercury ingested by fish or other animals remains in the animal (i.e. accumulates) and is passed on to humans or other animals when the former is ingested by the later. Furthermore, the mercury is never excreted from the body of the ingesting host. In the food chain, larger predators, which either live the longest and/or eat large quantities of other animals, are at the greatest risk of having excessive mercury accumulations. Humans, who eat too much mercury-laden animals, especially fish, are subject to a wide range of well-known medical issues including nervous system maladies and/or reproductive problems.

There are three primary types of mercury emissions: anthropogenic emissions, re-emission, and naturally occurring emissions. Anthropogenic emissions are mostly the result of industrial activity. Anthropogenic emission sources include industrial coal burning plants, natural gas burning facilities, cement production plants, oil refining facilities, the chloralkali industry, vinyl chloride industry, mining operations, and smelting operations. Re-emissions occur when mercury deposited in soils is re-dispersed via floods or forest fires. Mercury absorbed in soil and/or deposited in soil can be released back into the water via rain runoff and/or flooding. As such, soil erosion contributes to this problem. Forest fires, whether they are acts of nature, arson, or deliberate deforestation burning, re-emits mercury back into the air and/or water sources only to be deposited again elsewhere. Naturally occurring emissions include volcanoes and geothermal vents. It is estimated that about half of all mercury released into the atmosphere is from naturally occurring events such as volcanoes and thermal vents.

As noted above, coal burning plants release a large quantity of mercury and other contaminants into the environment each year. Accordingly, there are many ongoing efforts to reduce the amount of hazardous contaminants in the flue gas emissions produced by coal burning plants. Many coal burning plants in the USA are equipped with emissions control systems which capture, contain, and/or recover hazardous elements such as mercury. In coal burning plants, coal is burned to boil water, turning the water into steam, which is used to run electric generators. The flue gas emissions from the burning of coal are often conveyed through a conduit system to a fluid gas desulfurization unit and/or a spray dryer system, which remove some emissions and some of the noxious fumes such as sulfur dioxide (SO2) and hydrogen chloride (HCl) from the flue gases. A typical conduit system then routes the flow of flue gases to a wet or dry scrubber where more sulfur dioxide, hydrogen chloride, and fly ash are removed. The flow of flue gases is routed through a bag house where particulates are separated from the airflow in the flue gases, similar to the way a household vacuum cleaner bag works. The flue gases pass through the filter-like bags, which have a porosity allowing airflow but not the larger particulates traveling in the airflow. The surfaces of the filter bags are shaken and/or cleaned to collect the captured particulates so that they can be disposed of. Usually, these deposits are hazardous emissions themselves and must be disposed of accordingly. The balance of flue gasses that make it through this type of emissions control system is then allowed to escape through a tall smoke stack and released into the atmosphere.

The problem with this type of emissions control system is that it is virtually ineffective to capture and/or collect the heavy metals such as mercury contained in a metallic vapor and metallic compound vapor form. Since the coal fired burning systems burn coal at relatively elevated temperatures near 1,500 degrees Fahrenheit, the mercury is converted into nano-sized vapor particles that are able to slip through even the most capable filter systems. As a result, significant emissions of air borne mercury and other hazardous contaminants are released into the atmosphere.

In an effort to capture and collect mercury from coal fired systems and/or other emission sources of mercury, several known systems have been developed to address the problem, which generally fall into one of three categories.

The first category is a group of methods and/or systems that capture mercury by injecting a sorbent into the flue gas stream. Other than a noble metal, the most common sorbent material used is activated carbon, which is often halogenated with bromine. The injection of the sorbent into the flue gas is an attempt to capture contaminants in one and/or any combination of the following typical emissions control devices: an electrostatic precipitator, a fluidized gas desulfurization system, scrubber systems, or fabric filter systems. There are several variations of these systems, requiring the injection of activated carbon at various points of the emission control system after combustion of the coal. Some exemplary methods and/or systems of the first category are disclosed in U.S. Pat. Nos. 7,578,869, 7,575,629, 7,494,632, 7,306,774, 7,850,764, 7,704,920, 7,141,091, 6,905,534, 6,712,878, 6,695,894, 6,558,454, 6,451,094, 6,136,072, 7,618,603, 7,494,632, 8,747,676, 8,241,398, 8,728,974, 8,728,217, 8,721,777, 8,685,351, and 8,029,600. All of the methods and/or systems set forth in these exemplary patents generate hazardous and/or non-usable waste products, which pose their own problems for disposal. In addition, these methods and/or systems are generally not economically viable and are not capable of meeting the regulatory emissions requirements projected by the EPA and/or other global agencies.

The primary problem with the methods and/or systems of the first category of known solutions is that the use of activated carbon is expensive and inefficient. The initial expense of the activated carbon is amplified because only about 10% of the activated carbon interacts with the metallic vapor as it passes and flows through the system. Therefore, as much as 90% of expensive activated carbon is released into the flue gases as a lost expense, primarily in the form of carbon monoxide (CO) and/or carbon dioxide ($CO_2$). Another disadvantage is that activated carbon often renders the fly ash unsuitable as a raw material for the manufacture of concrete or other industrial products requiring fillers. While the sale of fly ash is not a large income producer, in high volume quantities, this byproduct of coal burning plants does provide an additional source of income. The byproduct quantities of fly ash that are not suitable for use as filler in concrete must be classified as a hazardous waste and is therefore subject to disposal fees. On the other hand, byproduct quantities of fly ash that are suitable for use as filler in concrete are not classified as a hazardous waste and therefore are saleable product and are not subject to disposal fees.

Another problem with the methods and/or systems of the first category of known solutions is that as much as 10% of the mercury in the flue gases is not removed and is released into the environment. This percentage is high compared to the amounts of released mercury permitted by the EPA and other global agencies. As a result, none of the methods and/or systems in the first category of known solutions meet current regulations for the collection and/or capture of mercury in coal burning plants or similar industrial applications.

Yet another problem with using activated carbon is that when activated carbon is burned, carbon monoxide and/or carbon dioxide is produced and released into the atmosphere. It is estimated that as much as 2.8 billion tons of carbon dioxide is generated annually in the USA alone from the use of activated carbon in coal fired plants. Worldwide, it is estimated that there is as much as 14.4 billion tons of carbon dioxide generated annually from the burning of activated carbon in coal fired plants. In addition, activated carbon is relatively ineffective at removing mercury from other forms of non-gaseous emissions and therefore alternative methods must be applied.

The second category is a group of methods and/or systems that pretreat the coal fuel before combustion in an effort to reduce the levels of mercury in the coal fuel. Some exemplary methods and/or systems of the second category are described in U.S. Pat. Nos. 7,540,384, 7,275,644, 8,651,282, 8,523,963, 8,579,999, 8,062,410, and 7,987,613. All of the methods and/or systems set forth in these exemplary patents generate large volumes of unusable coal, which is also considered a hazardous waste. As a result, the methods and/or systems of the second category of known solutions are inefficient and expensive to operate. Furthermore, substantial capital and physical space is often required for the pretreatment of coal, making it impractical to retrofit many existing emission control systems with the necessary equipment.

The third category is a group of methods and/or systems that inject a catalyst into the emissions control equipment upstream of the activated carbon injection system. The catalyst in these methods and/or systems ionize the mercury making it easier to collect and remove the mercury from the flue gasses. However, the efficiency of such methods and/or systems is poor and operating costs are high, such that the methods and/or systems of the third category of known solutions are not cost effective. Examples of the third category of are described in U.S. Pat. Nos. 8,480,791, 8,241,398, 7,753,992, and 7,731,781. In addition to these examples, U.S. Pat. No. 7,214,254 discloses a method and apparatus for regenerating expensive sorbent materials by using a microwave and a fluid bed reactor. The method selectively vaporizes mercury from the sorbent, at which point the mercury can be caught in a specialized filter or condensed and collected. The use of microwave generation renders this method impractical for large scale commercial applications and is therefore only useful for the regeneration of expensive sorbents. Another example is found in U.S. Patent Application Publication No. 2006/0120935, which discloses a method for the removal of mercury from flue gasses using any one of several substrate materials to form chemical attractions to the mercury as the flue gasses pass through the emissions control equipment. This method is also impractical for large scale commercial use.

Therefore, current emissions control systems and methods generally operate by transferring the hazardous contaminants from a gaseous emission to a non-gaseous emission, which creates another set of emission control problems.

While many laws and regulations focus on metallic vapor emissions, other forms of emissions containing hazardous contaminants such as slurry and/or slurry-like emissions, sludge and/or sludge-like emissions, liquid and/or liquid-like emissions, and other emission variations should not be overlooked. All of the emission types listed may also require processing where the hazardous contaminants they contain can be neutralized, captured, collected, removed, disposed of, and/or properly contained by one means or another. Historically, the most cost effective and most widely used process for removing hazardous contaminants utilizes activated carbon (in one form or another), through which the emissions pass. Accordingly, the demand for activated carbon in the USA is expected to grow each year through 2017 with over one billion pounds required each and every year at a cost to industries of over $1-$1.50/pound. This equates to about $1 billion annually. Most of the projected increase in demand for activated carbon is driven by the implementation of EPA promulgated regulations, which require utilities and industrial manufacturers to upgrade coal-fired power plants to comply with ever more stringent requirements.

In addition to the ever more stringent gaseous emissions regulations, the EPA has implemented tougher regulations for non-gaseous emissions through The Clean Water Act, which must be fully complied with by 2016. The combination of increasing regulations on all types of emissions impacts multiple types of emissions that are produced by a variety of different industries. Some industries, such as electrical power producers, who burn fuel to generate power, produce primary gaseous emissions containing hazardous contaminants. Per industry standards, these gaseous emissions are exposed to activated carbon materials in an effort to capture enough volume of hazardous contaminants so as to render the gaseous emission at or below allowable limits for contaminants. The process of removing the hazardous contaminants from the gaseous emissions generated from burning these fuels results in and/or generates secondary non-gaseous emissions in the form of liquid-like or slurry-like substances containing the hazardous contaminants. The hazardous contaminants in the second non-gaseous emissions must also be captured and/or contained appropriately to prevent the hazardous contaminants from being discharged into the environment. Both the primary gaseous emissions and the secondary non-gaseous emissions require a means of properly capturing and/or reclaiming and/or confining enough of the hazardous contaminants to comply with environmental regulations. The industrial costs associated with known available processes capable of accomplishing the removal of the hazardous contaminants from the secondary non-gaseous emissions are almost so cost prohibitive that some industries are forced to shut down facilities if they cannot pass the costs along to consumers.

In accordance with some practices, non-gaseous emissions, which are considered to be hazardous because they contain elevated levels of contaminants, are consigned and contained for long-term storage in ponds, piles, or drying beds. While such practices isolate the hazardous contaminants, they are expensive and consume land area without neutralizing the hazardous contaminants themselves, which can result in environmental hazards at the containment sites. One example of a non-gaseous emission is fly ash, which is a naturally-occurring product from the combustion of coal. Fly ash is basically identical in composition to volcanic ash. Fly ash contains trace concentrations (i.e. amounts) of many heavy metals and other known hazardous and toxic contaminants including mercury, beryllium, cadmium, barium, chromium, copper, lead, molybdenum, nickel, radium, selenium, thorium, uranium, vanadium, and zinc. Some estimates suggest that as much as 10% of the coal burned in the USA consists of unburnable material, which becomes ash.

As a result, the concentrations of hazardous trace elements in coal ash are as much as 10 times higher than the concentration of such elements in the original coal.

Fly ash is considered to be a pozzolan material with a long history of being used in the production of concrete because when it is mixed with calcium hydroxide a cementitious material is formed that aggregates with water and other compounds to produce a concrete mix well suited for roads, airport runways, and bridges. The fly ash produced in coal burning plants is flue-ash that is comprised of very fine particles which rise with the flue gases. Ash that does not rise is often called bottom ash. In the early days of coal burning plants, fly ash was simply released into the atmosphere. In recent decades, environmental regulations have required emission controls to be installed to prevent the release of fly ash into the atmosphere. In many plants the use of electrostatic precipitators capture the fly ash before it can reach the chimneys and exit to atmosphere. Typically the bottom ash is mixed with the captured fly ash to form what is known as coal ash. Usually, the fly ash contains higher levels of hazardous contaminants than the bottom ash, which is why mixing bottom ash with fly ash brings the proportional levels of hazardous contaminants within compliance of most standards for non-gaseous emissions. However, future standards may reclassify fly ash as a hazardous material. If fly ash is reclassified as a hazardous material it will be prevented from being utilized in the production of cement, asphalt, and many other widely used applications. It has been estimated by some studies that the cost increase of concrete in the USA alone would exceed $5 billion per year as a result of a ban on the usage of fly ash in concrete production. The increase in cost is a direct result of more expensive alternative materials being used in place of fly ash. In addition, no other known material is suitable as a direct replacement for fly ash in cement due to its unique physical properties.

Reports indicate that in the USA over 130 million tons of fly ash is produced annually by over 450 coal-fired power plants. Some reports estimate that barely 40% of this fly ash is re-used, indicating that as much as 52 million annual tons of fly ash is reused leaving as much as 78 million annual tons stored in bulk in slurry ponds and piles. Fly ash is typically stored in wet slurry ponds to minimize the potential of fugitive particulates becoming airborne, which could convey contaminants out of bulk storage and into the atmosphere and surrounding environment. In addition to airborne releases of bulk storage fly ash, there is a threat of breach and/or failure of the containment systems required for the long term containment of fly ash. One famous example of a breach occurred in 2008 in Tennessee, where an embankment of a wet storage fly ash pond collapsed, spilling 5.4 million cubic yards of fly ash. The spill damaged several homes and contaminated a nearby river. Cleanup costs are still ongoing at the time of this application and could exceed $1.2 billion.

In another example, non-gaseous emissions may be found as byproducts in typical wastewater generation systems of coal burning facilities. In typical wastewater generation systems, large volumes of water come from boiler blow down and cooling water processes. These large volumes of wastewater contain relatively low levels of contaminants and are used to dilute other waste streams containing much higher levels of contamination. The contaminated wastewater streams typically discharged from scrubber systems is diluted with the large volumes of wastewater from the boiler blow down and/or cooling water processes and then treated in large continuous mix tanks with lime to form gypsum, which is then pumped into settling ponds. During this process certain amounts of mercury and other heavy metals are entrained with the gypsum and stabilized for use in wallboard and cement. This gypsum is generally considered to be non-leaching and is not considered a pollution hazard. However, the water from the settling ponds is generally discharged into the waterways. Current regulations allow this ongoing discharge, but looming regulations propose that certain contaminants and/or levels of those contaminants be mandated as a hazardous pollution.

With regard to removing mercury and heavy metals from non-gaseous industrial wastewater streams, the use of carbonate, phosphate, or sulfide is often employed in an effort to reduce hazardous contaminants to low residual levels. One known method for removing mercury and other hazardous contaminants from industrial wastewater streams is chemical precipitation reaction. Another known method utilizes ion exchange. One of the primary problems with the chemical precipitation reaction and ion exchange methods is that these methods are not sufficient to fully comply with the ever more stringent EPA regulations for non-gaseous emissions when the amount of contaminants is high, such as for treating fly ash slurry emissions.

There are also various known commercial emissions control methods and systems sold under different tradenames for treating secondary non-gaseous emissions. One treatment method known by the tradename Blue PRO is a reactive filtration process that removes mercury from secondary non-gaseous emissions using co-precipitation and absorption. Another treatment method known by the tradename MERSORB-LW uses a granular coal based absorbent to remove mercury from secondary non-gaseous emissions by co-precipitation and absorption. Another treatment method known as Chloralkali Electrolysis Wastewater removes mercury from secondary non-gaseous emissions during the electrolytic production of chlorine. Another treatment method uses absorption kinetics and activated carbon derived from fertilizer waste to remove mercury from secondary non-gaseous emissions. Another treatment method uses a porous cellulose carrier modified with polyethyleneimine as an absorbent to remove mercury from secondary non-gaseous emissions. Another treatment method uses microorganisms in an enzymatic reduction to remove mercury from secondary non-gaseous emissions. Yet another treatment method known by the tradename MerCUR$_x$E uses chemical precipitation reactions to treat contaminated liquid-like non-gaseous emissions.

SUMMARY

This section provides a general summary of the disclosure, and is not a comprehensive disclosure of its full scope or all of its features.

In accordance with one aspect of the subject disclosure, an apparatus for removing contaminants from emissions is disclosed. The apparatus includes a housing that is shaped as a reverse venturi. The housing includes an entry portion for receiving the emissions at a pre-determined entry flow rate, an exit portion for expelling the emissions at a pre-determined exit flow rate, and an enlarged portion disposed between the entry portion and the exit portion of the housing for trapping the contaminants in the emissions. The entry portion, the exit portion, and the enlarged portion of the housing are arranged in fluid communication with each other. In addition, the entry portion of the housing has an entry portion cross-sectional area, the exit portion of said housing has an exit portion cross-sectional area, and the enlarged portion of the housing has an enlarged portion cross-sectional area. In accordance with the reverse venturi shape of the housing, the enlarged portion cross-sectional area is larger than the entry portion cross-sectional area and the exit portion cross-sectional area. Due to this geometry of the housing, the emissions entering the enlarged portion of the housing slow down and pass through the enlarged portion of the housing at a slower velocity relative to a velocity of the emissions passing through the entry portion and the exit portion of the housing. Because the flow of the emissions slows down in the enlarged portion of the housing, a dwell time of the emissions in the enlarged portion of the housing is increased. The apparatus also includes a mass of reactive material that is disposed within the enlarged portion of the housing. The mass of reactive material has a reactive outer surface that is disposed in contact with the emissions. Furthermore, the mass of reactive material contains an amalgam forming metal at the reactive outer surface. The amalgam forming metal in the mass of reactive material chemically binds at least some of the contaminants in the emissions that are passing through the enlarged portion of the housing to the reactive outer surface of the mass of reactive material.

In accordance with another aspect of the subject disclosure, an emissions control method is disclosed for removing contaminants from gaseous emissions. The method includes the steps of: burning a fuel in a furnace to generate gaseous emissions that contain contaminants, passing the gaseous emissions through an electrostatic precipitator and removing a first portion of particulate contaminants from the gaseous emissions using the electrostatic precipitator, passing the gaseous emissions through a fluidized gas desulfurization unit and removing sulfur dioxide contaminants from the gaseous emissions using the fluidized gas desulfurization unit, and passing the gaseous emissions through a fabric filter unit and removing a second portion of particulate contaminants from the gaseous emissions using the fabric filter unit. The method may also include the step of passing the gaseous emissions through a reverse venturi apparatus and removing heavy metal contaminants from the gaseous emissions using the reverse venturi apparatus. The step of passing the gaseous emissions through a reverse venturi apparatus and removing heavy metal contaminants from the gaseous emissions using the reverse venturi apparatus includes passing the gaseous emissions by a mass of reactive material disposed in the reverse venturi apparatus. The mass of reactive material contains an amalgam forming metal that chemically binds with the heavy metal contaminants in the gaseous emissions. Accordingly, the heavy metal contaminants become trapped in the reverse venturi apparatus when the heavy metal contaminants chemically bind with the amalgam forming metal in the mass of reactive material. The method may further include the step of routing the gaseous emissions to a stack that vents the gaseous emissions to a surrounding atmosphere.

In accordance with yet another aspect of the subject disclosure, an emissions control method is disclosed for removing contaminants from non-gaseous emissions. The method includes the steps of depositing non-gaseous emissions that contain contaminants in a settling pond where some of the contaminants in the non-gaseous emissions are removed by sedimentation, dewatering a first portion of the non-gaseous emissions in the settling pond and using the dewatered by-product in a secondary industrial process, and removing a second portion of the non-gaseous emissions from the settling pond and subjecting the second portion of the non-gaseous emissions to a dry disposal process. The method may also include the step of routing a third portion of the non-gaseous emissions in the settling pond to a treatment tank containing a sorbent. The sorbent contains an amalgam forming metal that chemically binds with heavy metal contaminants in the third portion of non-gaseous emissions. Accordingly, the sorbent traps the heavy metal contaminants in the treatment tank when the heavy metal contaminants chemically bind with the amalgam forming metal in the sorbent. The method may further include the step of routing the non-gaseous emissions from the treatment tank to a waterway for discharge.

The apparatus and the methods set forth herein provide a number of advantages over known emissions control systems and methods. The apparatus and methods of the subject disclosure significantly reduce and/or eliminate the need for usage of activated carbon in coal fired emissions. At present, the initial cost for the amalgam forming metal in the mass of reactive material and the sorbent disclosed herein is slightly more than the $1-$1.50 pound acquisition cost of activated carbon. However, since the amalgam forming metal can be rejuvenated and the hazardous contaminants can be harvested for reuse, the increased cost is a one-time cost. As a result, the initial first year cost for using the amalgam forming metal containing materials disclosed herein, combined with the reclamation and rejuvenation costs, is estimated to be 1.5 times the annual cost of activated carbon or as much as $1.5 billion for the entire USA. However, the estimated annual cost going forward after the initial first year investment includes only the annual reclamation and rejuvenation costs, which are estimated to be $0.25 billion for the entire USA. Therefore, over a 10-year period, the first year cost to the USA industry would be $1.5 billion with annual reclamation and rejuvenation costs of $0.25 billion for each of the next nine years for a 10-year total of $3.75 billion. This number is low compared to a cost of over $10 billion using activated carbon, where a significant savings to the industry of $6.5 billion over a 10-year period may be realized.

In addition to the advantage of significant savings, the subject apparatus and methods are more effective at removing hazardous contaminants from gaseous and non-gaseous emissions compared to known emissions control systems and methods. It is estimated that these improvements are significant enough to enable industries to meet and/or exceed the projected regulation requirements, which is not economically viable with current technology. Therefore, the subject apparatus and methods have the potential of allowing the continued use of fly ash, even if regulatory requirements reclassify fly ash as a hazardous material, thus avoiding significant increased cost to the construction industry, utility power generation industry, and other industries producing non-gaseous ash-type byproducts.

The apparatus and methods of the subject disclosure also significantly reduces the dependency on, if not eliminating the need altogether for use of, activated carbon in the removal of hazardous contaminants from gaseous emissions. Advantageously, the reduced use of activated carbon in emissions control systems is estimated to reduce the annual generation of carbon dioxide by as much as 2 billion tons in the USA alone.

There are also a number of advantages attendant to the specialized sorbent described herein in connection with the disclosed apparatus and methods. Generally, the sorbent improves the capabilities of the disclosed emissions equipment to better capture, contain, and/or recycle mercury and other hazardous materials with an efficiency not previously possible using known emission control systems and methods. Another significant benefit of the sorbent disclosed herein is that the sorbent can be used to treat both gaseous and non-gaseous emissions, thus overcoming many of the shortcomings of known methods for treating contaminated non-gaseous emissions, including the secondary emissions generated from primary emissions control processes that are used to treat gaseous emissions. In addition, the sorbent described herein provides improved capabilities to treat gaseous emissions effectively enough to prevent the need for the secondary treatment of non-gaseous emissions that are produced as a by-product of the primary gaseous emissions treatment process. The sorbent disclosed herein is also beneficial because it is reusable. Through a rejuvenation process, the hazardous contaminants that chemically bind with the amalgam forming metal in the sorbent can be harvested away (i.e. removed) from the sorbent, thus restoring the capacity of the sorbent to remove contaminants from the gaseous and/or non-gaseous emissions.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a schematic diagram of the emissions control system shown in FIG. 2 where the emissions control system has been modified by the adding an exemplary reverse venturi apparatus that is constructed in accordance with the subject disclosure;

FIG. 4B is a front cross-sectional view of the entry portion of the housing of the exemplary reverse venturi apparatus illustrated in FIG. 4A;

FIG. 4C is a front cross-sectional view of the enlarged portion of the housing of the exemplary reverse venturi apparatus illustrated in FIG. 4A;

FIG. 4D is a front cross-sectional view of the exit portion of the housing of the exemplary reverse venturi apparatus illustrated in FIG. 4A;

FIG. 6A is a side cross-sectional view of another exemplary reverse venturi apparatus constructed in accordance with the subject disclosure where an auger-shaped baffle is disposed in the enlarged portion of the housing creating a helically shaped flow path for the emissions;

FIG. 7B is a front cross-sectional view of the exemplary reverse venturi apparatus illustrated in FIG. 7A taken along section line A-A where orifices in one of the baffles are shown;

DETAILED DESCRIPTION

Figure 1:
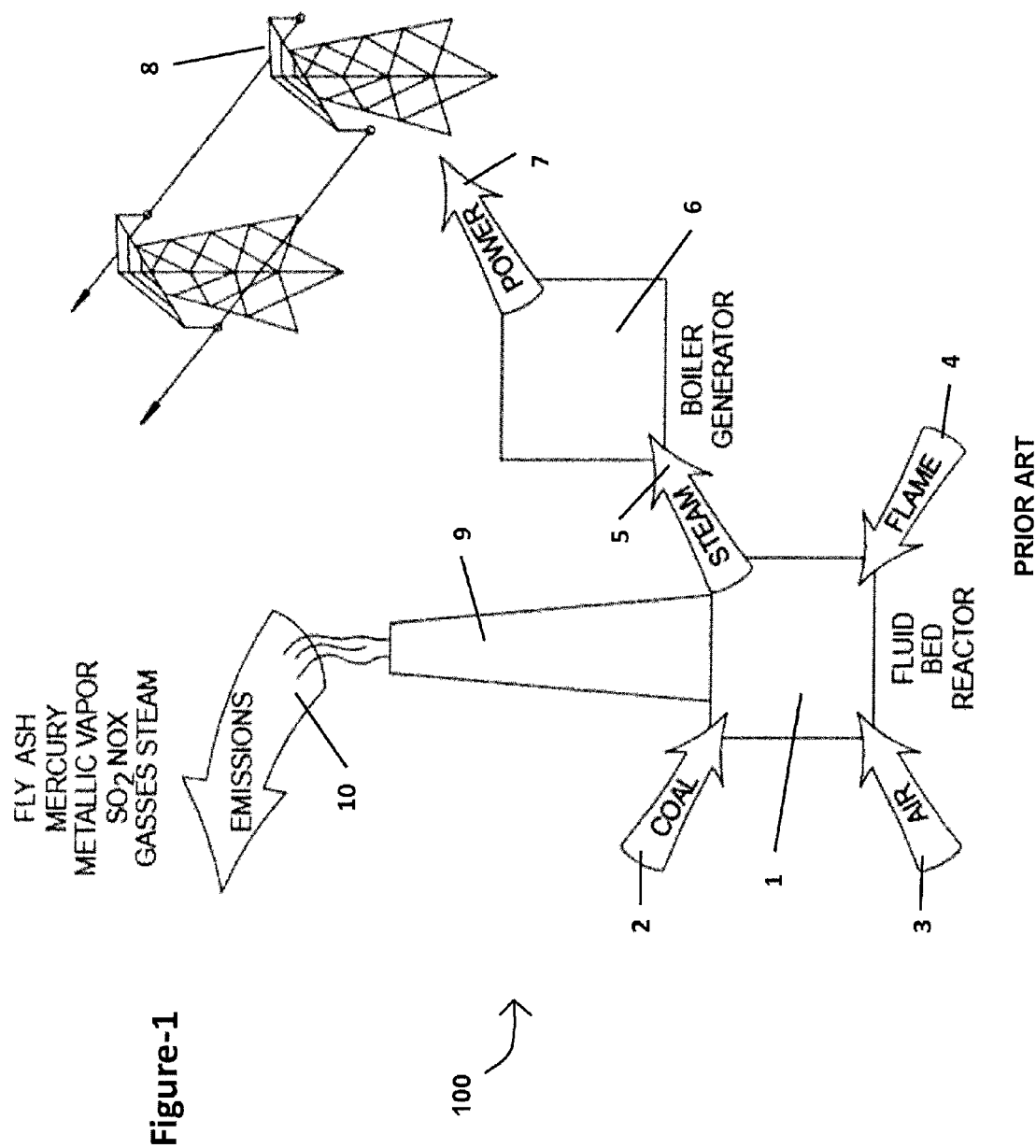
FIG. 1 is a schematic diagram illustrating a known layout for a coal burning power plant.

Referring to the Figures, wherein like numerals indicate corresponding parts throughout the several views, an apparatus and methods for removing contaminants from industrial emissions are illustrated.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Additionally, the term "conduit", as used herein, is intended to cover all references to pipe as may be normally used in conveying liquid, and/or liquid-like emissions and gaseous and/or gaseous-like emissions. No preference is given or implied concerning the actual method of conveyance of emissions regardless of the type of emissions.

Referring to FIG. 1, a schematic diagram of a typical coal burning power plant 100 is shown. The coal burning power plant 100 includes an industrial facility fluid bed reactor 1 that burns one or more types of coal fuel 2 to produce electrical power 7. The electrical power 7 may then be distributed through power lines 8 to an electrical grid. Combustion within the fluid bed reactor 1 is driven by air 3, flame 4, and the coal fuel 2. The combustion process is used to heat water and produce steam 5. The steam is then used for turning a generator 6, which produces the electrical power 7. Gaseous emissions 10 from the combustion process are released into the environment through stack 9. When the coal burning power plant 100 is not equipped with any emissions control systems (FIG. 1), the emissions 10 include many hazardous contaminants such as fly ash, mercury (Hg), metallic vapors, sulfur dioxide ($SO_2$), hydrogen chloride (HCl), and other noxious fumes.

Figure 2:
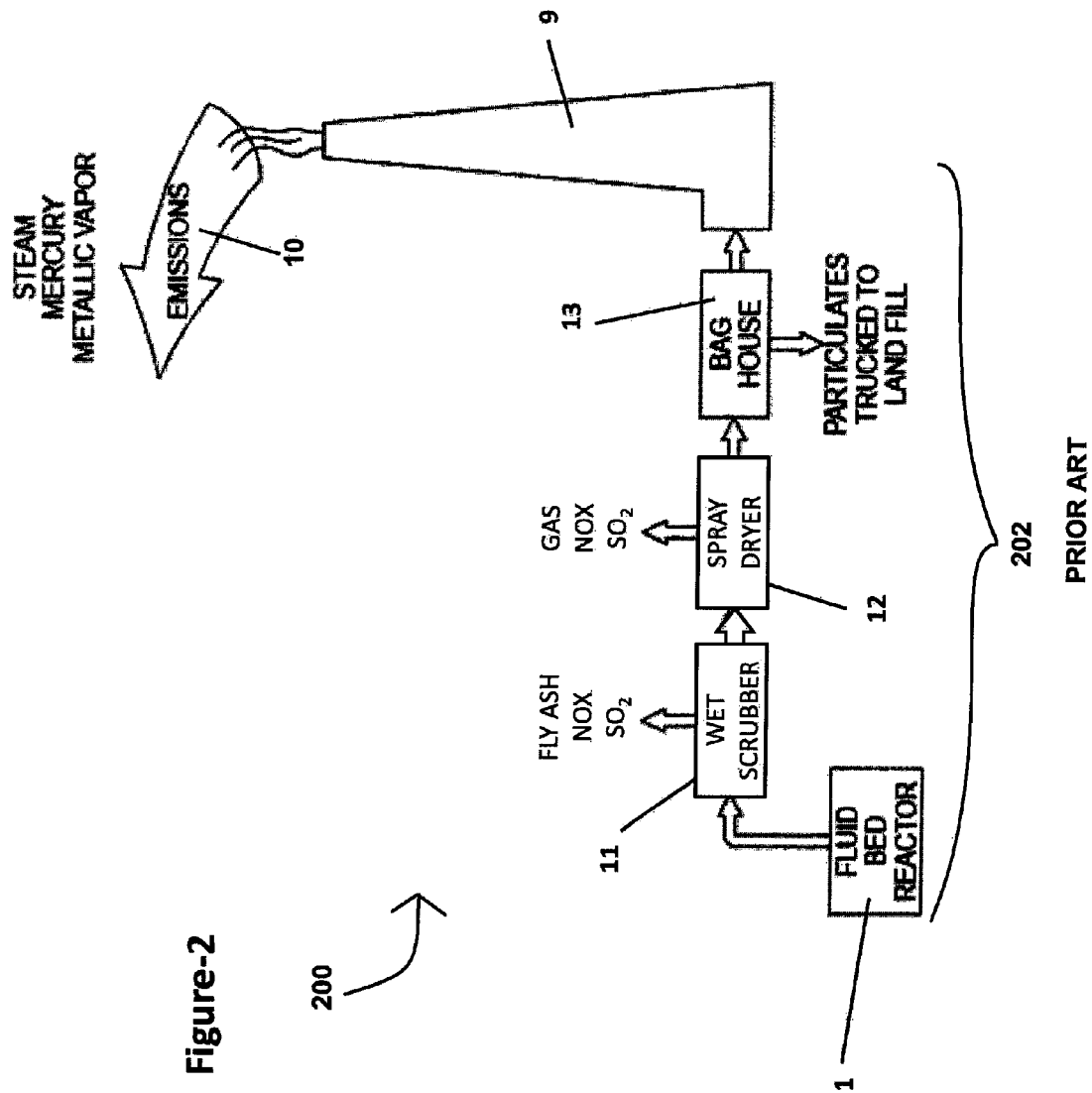
FIG. 2 is a schematic diagram illustrating a known layout for an emissions control system used to remove contaminants from emissions produced by coal burning power plants of the type shown in FIG. 1.

Referring to FIG. 2, a schematic of an updated coal burning power plant 200 is shown, which includes a typical emissions control system 202. The emission control system 202 helps to capture and collect some of the hazardous contaminants in the gaseous emissions 10. The emissions control system 202 conveys the gaseous emissions 10 from a fluid bed reactor 1 where combustion occurs into a wet or dry scrubber 11 that removes some of the sulfur dioxide and fly ash contaminants from the gaseous emissions 10. Alternatively or in addition to the conveying the gaseous emissions 10 to the wet or dry scrubber 11, the emissions control system 202 may convey the gaseous emissions 10 into a spray dryer 12 where some sulfur dioxide, noxious fumes, and other contaminants are captured and collected. The emissions may also be routed through a fabric filter unit 13 (i.e. a bag house), which uses filter bags to remove particulates from the flow of gaseous emissions 10. This system collects and removes many contaminants from the gaseous emissions 10 before the gaseous emissions 10 are released into the surrounding atmosphere (i.e. the environment) through the stack 9. The problem with the typical emissions control system 202 illustrated in FIG. 2 is that the nano-sized contaminants, such as mercury, which is contained in metallic vapor emissions, easily passes through the wet or dry scrubber 11, spray dryer 12, and the fabric filter unit 13 of the emissions control system 202.

With reference to FIG. 3, a schematic of a modified coal burning power plant 300 is shown, which includes a sorbent injector 14 and a reverse venturi apparatus 15 in addition to the emissions control system 202 shown in FIG. 2. The sorbent injector 14 operates to add a sorbent into the gaseous emissions 10 and may optionally be disposed upstream of the reverse venturi apparatus 15. More particularly, in the example shown in FIG. 3, the sorbent injector is positioned between the spray dryer 12 and the fabric filter unit 13. Although alternative locations for the reverse venturi apparatus 15 are possible, in FIG. 3, the reverse venturi apparatus is positioned between the fabric filter unit 13 and the stack 9. One primary advantage of this location is that an existing facility would be able to install the reverse venturi apparatus 15 and simply apply for a "Modification to Existing Permit", saving both time and money compared to applying for a new permit for an entirely new emissions control system. In operation, the gaseous emissions 10 are routed from the fabric filter unit 13 and to the reverse venturi apparatus 15. As will be explained in greater detail below, the reverse venturi apparatus 15 is constructed with internal features that are suitable for collecting and capturing significant amounts of mercury, heavy metals, nano-sized particles, and other contaminants. Therefore, the resulting gaseous emissions 10 exiting the stack 9 are virtually stripped clean of all hazardous contaminants.

With reference to FIGS. 4A-D, the reverse venturi apparatus 15 includes a housing 16 that is shaped as a reverse venturi. It should be appreciated that a venturi may generally be described as a conduit that first narrows from a larger cross-section down to a smaller cross-section and then expands from the smaller cross-section back to a larger cross-section. Therefore, the term "reverse venturi", as used herein, describes the opposite—a conduit that first expands from a smaller cross-section to a larger cross-section and then narrows back down from the larger cross-section to a smaller cross-section. Specifically, the housing 16 of the disclosed reverse venturi apparatus 15 extends along a central axis 17 and has an entry portion 18, an enlarged portion 19, and an exit portion 20. The entry portion 18 of the housing 16 is sized to receive the gaseous emissions 10 at a pre-determined entry flow rate, which is characterized by an entry velocity $V_1$ and pressure $P_1$. The exit portion 20 of the housing 16 is sized to expel the gaseous emissions 10 at a pre-determined exit flow rate, which is characterized by an exit $V_3$ and pressure $P_3$. The enlarged portion 19 is disposed between the entry portion 18 and the exit portion 20 of the housing 16 and defines an enlarged chamber 21 therein for trapping the contaminants in the gaseous emissions 10. The enlarged portion 19 of the housing 16 has an interior surface 68 that generally faces the central axis 17. The entry portion 18, the enlarged portion 19, and the exit portion 20 of the housing 16 are arranged sequentially along the central axis 17 such that the entry portion 18, the enlarged portion 19, and the exit portion 20 of the housing 16 are in fluid communication with each other. In other words, the entry portion 18, the enlarged portion 19, and the exit portion 20 of the housing 16 cooperate to form a conduit extending along the central axis 17.

The entry portion 18 of the housing 16 has an entry portion cross-sectional area $A_1$ that is transverse to the central axis 17 and the exit portion 20 of the housing 16 has an exit portion cross-sectional area $A_3$ that is transverse to the central axis 17. The entry portion cross-sectional area $A_1$ may equal (i.e. may be the same as) the exit portion cross-sectional area $A_3$ such that the pre-determined entry flow rate equals (i.e. is the same as) the pre-determined exit portion flow rate. Alternatively, the entry portion cross-sectional area $A_1$ may be different (i.e. may be larger or smaller) than the exit portion cross-section area $A_3$ such that the pre-determined entry flow rate is different (i.e. is less than or is greater than) the pre-determined exit flow rate. It should be appreciated that the term "flow rate", as used herein, refers to a volumetric flow rate of the emissions.

The enlarged portion 19 of the housing 16 has an enlarged portion cross-sectional area $A_2$ that is transverse to the central axis 17 and that is larger than the entry portion cross-sectional area $A_1$ and the exit portion cross-sectional area $A_3$. Accordingly, the enlarged portion 19 is sized such that a flow velocity $V_2$ of the gaseous emissions 10 within the enlarged portion 19 of the housing 16 is less than the flow velocity $V_1$ of the gaseous emissions 10 in the entry portion 18 of the housing 16 and is less than the flow velocity $V_3$ of the gaseous emissions 10 in the exit portion 20 of the housing 16. This decreased flow velocity in turn increases a dwell time of the gaseous emissions 10 within the enlarged portion 18 of the housing 16. It should be appreciated that the term "dwell time", as used herein, refers to the average amount of time required for a molecule in the gaseous emissions 10 to travel through the enlarged portion 18 of the housing 16. In other words, the "dwell time" of the enlarged portion 18 of the housing 16 equals the amount of time it takes for all of the emissions in the enlarged chamber 21 to be renewed. It should also be appreciated that the term "cross-sectional area", as used herein, refers to the internal cross-sectional area (i.e. the space inside the housing 16), which remains the same irrespective of changes to a thickness of the housing 16. Therefore, the enlarged portion cross-sectional area $A_2$ reflects the size of the enlarged chamber 21 and is bounded by the interior surface 68.

Due to the geometry of the housing 16, the internal pressure $P_1$ of the gaseous emissions 10 passing through the entry portion 18 of the housing 16 and the internal pressure $P_3$ of the gaseous emissions 10 passing through the exit portion 20 of the housing 16 are greater than an internal pressure $P_2$ of the gaseous emissions 10 passing through the enlarged portion 19 of the housing 16. This pressure differential in combination with the fact that the flow velocity $V_2$ of the gaseous emissions 10 within the enlarged portion 19 of the housing 16 is less than the flow velocity $V_1$ of the gaseous emissions 10 in the entry portion 18 of the housing 16 and is less than the flow velocity $V_3$ of the gaseous emissions 10 in the exit portion 20 of the housing 16 causes the gaseous emissions 10 to dwell in the enlarged portion 19 of the housing 16. As a result of the pressure and velocity differentials noted above and because the gaseous emissions 10 will naturally expand to occupy the entire volume of the enlarged chamber 68, an expansion force is thus imparted on the gaseous emissions 10 in the enlarged portion 19 of the housing 16. This in combination with the effects of laminar flow, pneumatic dynamics, and gas behavior physics, the resultant increase in dwell time improves the ability of the reverse venturi apparatus 15 to efficiently capture and thereby remove contaminants from the gaseous emissions 10.

The housing 16 may have a variety of different shapes and configurations. For example and without limitation, the entry portion 18, the enlarged portion 19, and the exit portion 20 of the housing 16 illustrated in FIGS. 4A-D all have circular shaped cross-sectional areas $A_1$, $A_2$, $A_3$. Alternatively, the cross-sectional areas $A_1$, $A_2$, $A_3$ of one or more of the entry portion 18, the enlarged portion 19, and the exit portion 20 of the housing 16 may have a non-circular shape, where various combinations of circular and non-circular shaped cross-sectional areas are possible and are considered to be within the scope of the subject disclosure. In some configurations, the enlarged portion 19 of the housing 16 may have a divergent end 22 and a convergent end 23. In accordance with these configurations, the enlarged portion 19 of the housing 16 gradually tapers outwardly from the entry portion cross-sectional area $A_1$ to the enlarged portion cross-sectional area $A_2$ at the divergent end 22. In other words, the cross-section of the enlarged portion 19 of the housing 16 increases at the divergent end 22 moving in a direction away from the entry portion 18 of the housing 16. By contrast, the enlarged portion 19 of the housing 16 gradually tapers inwardly from the enlarged portion cross-sectional area $A_2$ to the exit portion cross-sectional area $A_3$ at the convergent end 23. In other words, the cross-section of the enlarged portion 19 of the housing 16 decreases at the convergent end 23 moving in a direction towards the exit portion 20 of the housing 16. Therefore, it should be appreciated that the gaseous emissions 10 in the enlarged portion 19 of the housing 16 generally flow from the divergent end 22 to the convergent end 23. In embodiments where the entry portion 18, the enlarged portion 19, and the exit portion 20 of the housing 16 all have circular shaped cross-sectional areas $A_1$, $A_2$, $A_3$, the divergent and convergent ends 22, 23 of the housing 16 may generally have a conical shape. Notwithstanding, alternative shapes for the divergent and convergent ends 22, 23 of the enlarged portion 19 of the housing 16 are possible. By way of example and without limitation, the divergent and convergent ends 22, 23 may have a polygonal shape for improved manufacture ease while avoiding any significant detrimental effects to the flow of the gaseous emissions 10 through the housing 16 of the reverse venturi apparatus 15. In another alternative configuration, the enlarged portion 19 of the housing 16 may have a shape resembling a sausage with relatively abrupt transitions between the entry portion 18 and the divergent end 22 and the convergent end 23 and the exit portion 20. It is presumed that a smooth transition is preferred to an abrupt transition because laminar flow behavior of the gaseous emissions 10 may be preferred. However, minor disturbances to the laminar flow of the gaseous emissions 10 at abrupt transitions are not perceived to be an overwhelming penalty, but rather may provide enhanced flow in areas where increased dwell time is not necessary.

With continued reference to FIGS. 4A-D and with additional reference to FIGS. 5-11, a mass of reactive material 24 is disposed within the enlarged portion 19 of the housing 16. The mass of reactive material 24 has a reactive outer surface 25 that is disposed in contact with the gaseous emissions 10. In addition, the mass of reactive material 24 contains an amalgam forming metal at the reactive outer surface 25 that chemically binds at least some of the contaminants in the gaseous emissions 10 that are passing through the enlarged portion 19 of the housing 16 to the reactive outer surface 25 of the mass of reactive material 24. In this way, the contaminants bound to the reactive outer surface 25 of the mass of reactive material 24 remain trapped in the enlarged portion 19 of the housing 16 and are thus removed from the flow of the gaseous emissions 10 exiting the enlarge portion 19 of the housing 16 and entering the exit portion 20 of the housing 16. It should be appreciated that the term "amalgam forming metal", as used herein, describes a material, selected from a group of metals, that is capable of forming a compound with one or more of the contaminants in the gaseous emissions 10. By way of non-limiting example, the amalgam forming metal may be zinc and the contaminant in the gaseous emissions 10 may be mercury such that an amalgam of zinc and mercury is formed when the gaseous emissions 10 come into contact with the reactive outer surface 25 of the mass of reactive material 24.

It should be appreciated that the enlarged portion 19 of the housing 16 must be sized to accommodate the pre-determined entry flow rate of the gaseous emissions 10 while providing a long enough dwell time to enable the amalgam forming metal in the mass of reactive material 24 to chemically bind with the contaminants in the gaseous emissions 10. Accordingly, to achieve this balance, the enlarged portion cross-sectional area $A_2$ may range from 3 square feet to 330 square feet in order to achieve a dwell time ranging from 1 second to 2.5 seconds. The specified dwell time is necessary to allow sufficient time for the contaminants in the gaseous emissions 10 to chemically bind to the amalgam forming metal in the mass of reactive material 24. Thus, the range for the enlarged portion cross-sectional area $A_2$ was calculated to achieve this residence time for coal burning power plants 100 with outputs ranging from 1 Mega Watt (MW) to 6,000 Mega Watts (MW). As is known in the chemical arts, the amalgam forming metal may be a variety of different materials. By way of non-limiting example, the amalgam forming metal may be selected from a group consisting of zinc, iron, and aluminum. It should also be appreciated that the housing 16 is made from a material that is different from the mass of reactive material 24. By way of non-limiting example, the housing 16 may be made from steel, plastic, or fiberglass.

Figure 4A:
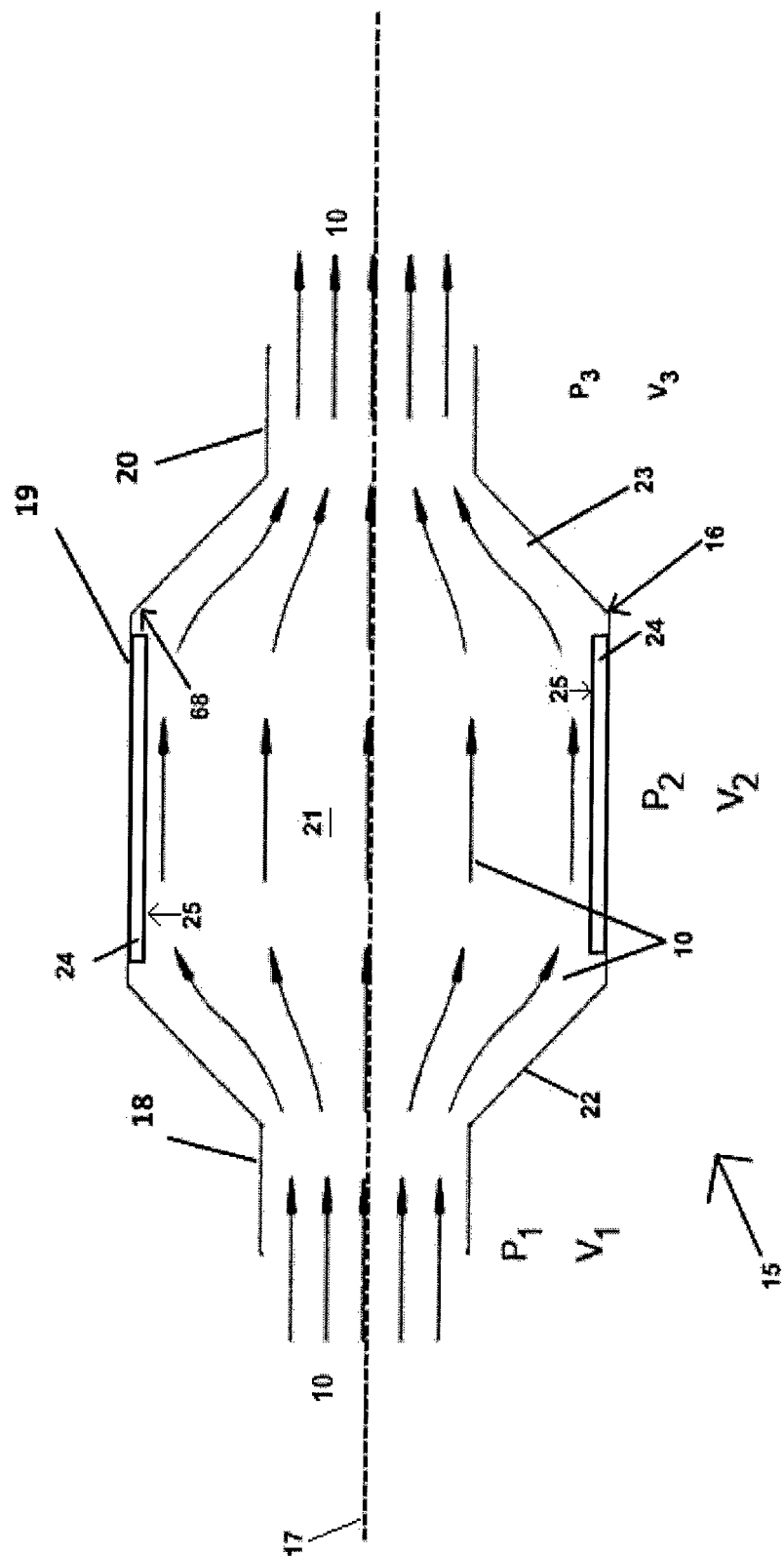
FIG. 4A is a side cross-sectional view of an exemplary reverse venturi apparatus constructed in accordance with the subject disclosure, which includes a housing having an entry portion, an enlarged portion, and an exit portion.

The mass of reactive material 24 may be provided in a variety of different, non-limiting configurations. With reference to FIG. 4A, the mass of reactive material 24 is shown coating the interior surface 68 of the housing 16. Alternatively, with reference to FIGS. 5-11, the mass of reactive material 24 may form one or more obstruction elements 26a-j that are disposed within the enlarged portion 19 of the housing 16. As such, the obstruction element(s) 26a-j create a tortuous flow path 27 for the gaseous emissions 10 passing through the enlarged portion 19 of the housing 16. Accordingly, the obstruction element(s) 26a-j increase the dwell time for the gaseous emissions 10 passing through the enlarged portion 19 of the housing 16. Several of the embodiments discussed below break up the flow of the gaseous emissions 10 passing through the enlarged portion 19 of the housing 16 so completely that the tortuous flow path 27 created is completely random, which greatly enhances the opportunity for chemical reactions between the contaminants in the gaseous emissions 10 and the amalgam forming metal in the mass of reactive material 24.

The obstruction element(s) 26*a-j* in each of the configurations shown in FIGS. 5-11 present a large surface area, such that the reactive outer surface 25 of the mass of reactive material 24 is large. This is advantageous because chemical reactions between the amalgam forming metal in the reactive outer surface 25 of the mass of reactive material 24 and contaminants in the gaseous emissions 10 allow the enlarged portion 19 of the housing 16 to trap, capture, and/or collect the contaminants, thereby removing/eliminating them from the gaseous emissions 10. Accordingly, the amount of contaminants that the enlarged portion 19 of the housing 16 can remove from the gaseous emissions 10 passing through the enlarged cavity 21 is proportional to the size of the reactive outer surface 25 of the mass of reactive material 24 in the enlarged portion 19 of the housing 16. In addition, the complex surface shapes and/or texture of the obstruction(s) 26*a-j* can provide additional surface area to facilitate the physical capture of contaminants whether the capture is the result of a chemical reaction between the contaminants and the amalgam forming metal or not.

Referring again to FIG. 3, the sorbent that is added to the emissions by the sorbent injector 14 contains the amalgam forming metal. As such, the amalgam forming metal in the sorbent chemically binds with at least some of the contaminants in the gaseous emissions 10 before the gaseous emissions 10 enter the enlarged portion 19 of the housing 16. Although the sorbent may have a number of different compositions, the sorbent may be, for example, a zinc (Zn) powder or a copper, zinc, tin, sulfide (CZTS) compound. Because the sorbent chemically binds with at least some of the contaminants in the gaseous emissions 10 before the gaseous emissions 10 enter the enlarged portion 19 of the housing 16, the sorbent helps the mass of reactive material 24 remove the contaminants from the gaseous emissions 10.

Figure 5:
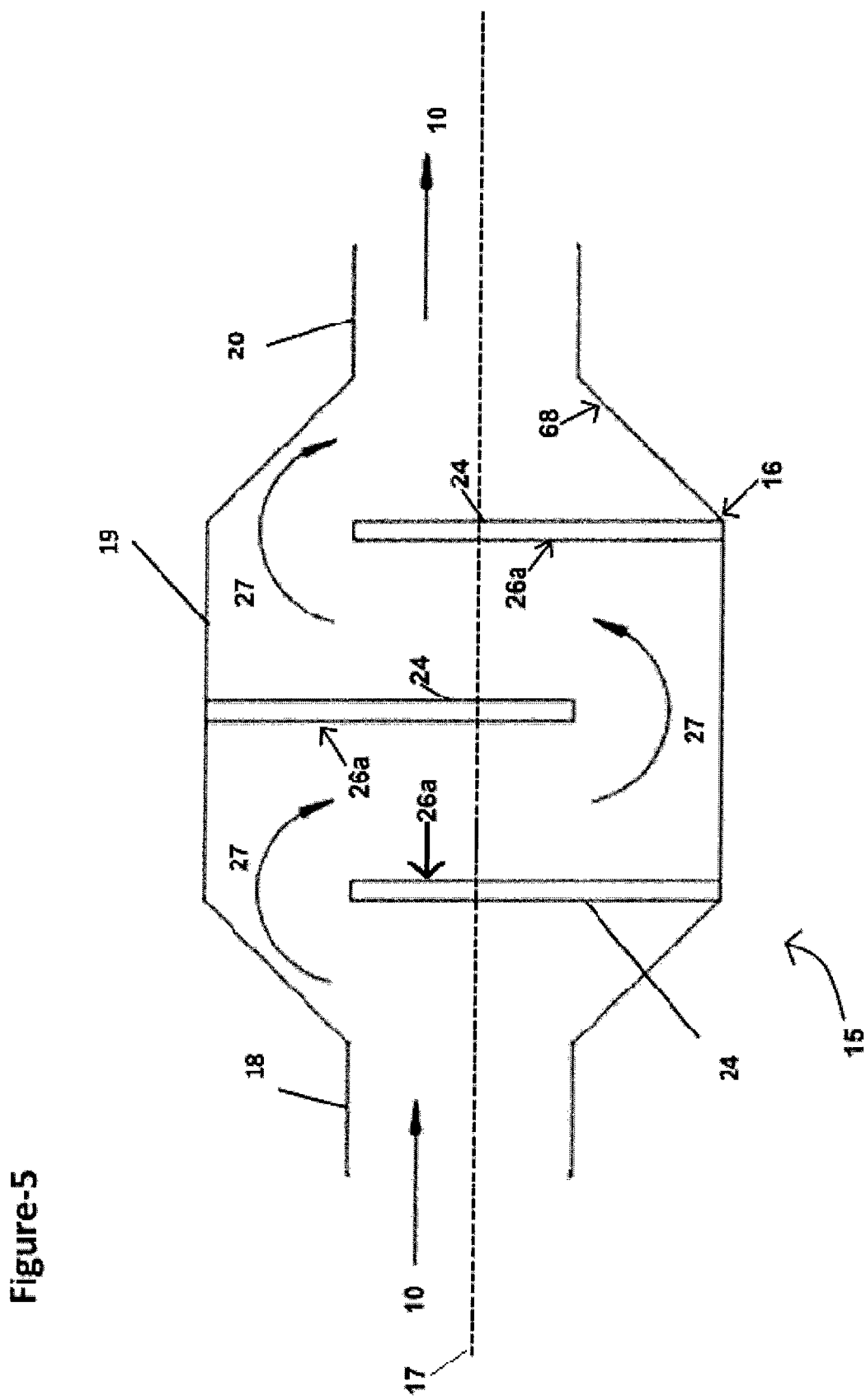
FIG. 5 is a side cross-sectional view of another exemplary reverse venturi apparatus constructed in accordance with the subject disclosure where a series of staggered baffles are disposed in the enlarged portion of the housing creating a serpentine shaped flow path for the emissions.

With reference to FIG. 5, the obstruction elements 26*a-j* are provided in the form of a series of staggered baffles 26*a* that extend from the interior surface 68 of the enlarged portion 19 of the housing 16. The series of staggered baffles 26*a* are transverse to the central axis 17 and give the tortuous flow path 27 a serpentine shape. The serpentine shape of the tortuous flow path 27 increases the dwell time of the gaseous emissions 10 in the enlarged portion 19 of the housing 16, which in turn improves the capture and removal of the contaminants in the gaseous emissions 10 by the mass of reactive material 24 forming the series of staggered baffles 26*a*. In one variation, the series of staggered baffles 26*a* are made of zinc. In another variation, the series of staggered baffles 26*a* are made of a non-zinc material that is zinc coated. It should be appreciated that the placement of the staggered baffles 26*a* need not be equally or symmetrically oriented along a length of the central axis 17 because some applications may benefit from larger spaces between adjacent baffles 26*a* while other applications may benefit from smaller spaces between adjacent baffles 26*a*. It should also be appreciated that the series of staggered baffles 26*a* can be replaced and/or cleaned as necessary if they become saturated during operation of the reverse venturi apparatus 15.

Figure 6B:
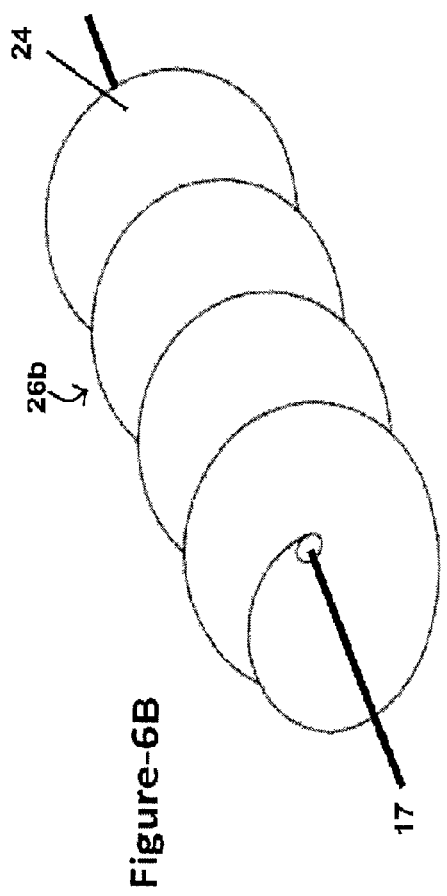
FIG. 6B is a front perspective view of the auger-shaped baffle illustrated in the exemplary reverse venturi apparatus shown in FIG. 6A.

With reference to FIGS. 6A-B, the at least one obstruction element 26*a-j* is alternatively in the form of an auger-shaped baffle 26*b*. The auger-shaped baffle 26*b* extends helically within the enlarged portion 19 of the housing 16 along and about the central axis 17. Accordingly, the auger-shaped baffle 26*b* gives the tortuous flow path 27 a spiraling shape. The spiraling shape of the tortuous flow path 27 increases the dwell time of the gaseous emissions 10 in the enlarged portion 19 of the housing 16, which in turn improves the capture and removal of the contaminants from the gaseous emissions 10 by the mass of reactive material 24 forming the auger-shaped baffle 26*b*. In one variation, the auger-shaped baffle 26*b* is made of zinc. In another variation, the auger-shaped baffle 26*b* is made of a non-zinc material that is zinc coated. In yet another variation, the auger-shaped baffle 26*b* is mechanically driven such the auger-shaped baffle 26*b* rotates within the enlarged portion 19 of the housing 16 about the central axis 17. Rotation of the auger-shaped baffle 26*b* can either artificially accelerate or artificially slow the flow of the gaseous emissions 10 through the enlarged portion 19 of the housing 16, depending upon which direction the auger-shaped baffle rotates. It should be appreciated that the auger-shaped baffle 26*b* can be replaced and/or cleaned as necessary if the auger-shaped baffle 26*b* becomes saturated during operation of the reverse venturi apparatus 15.

Figure 7A:
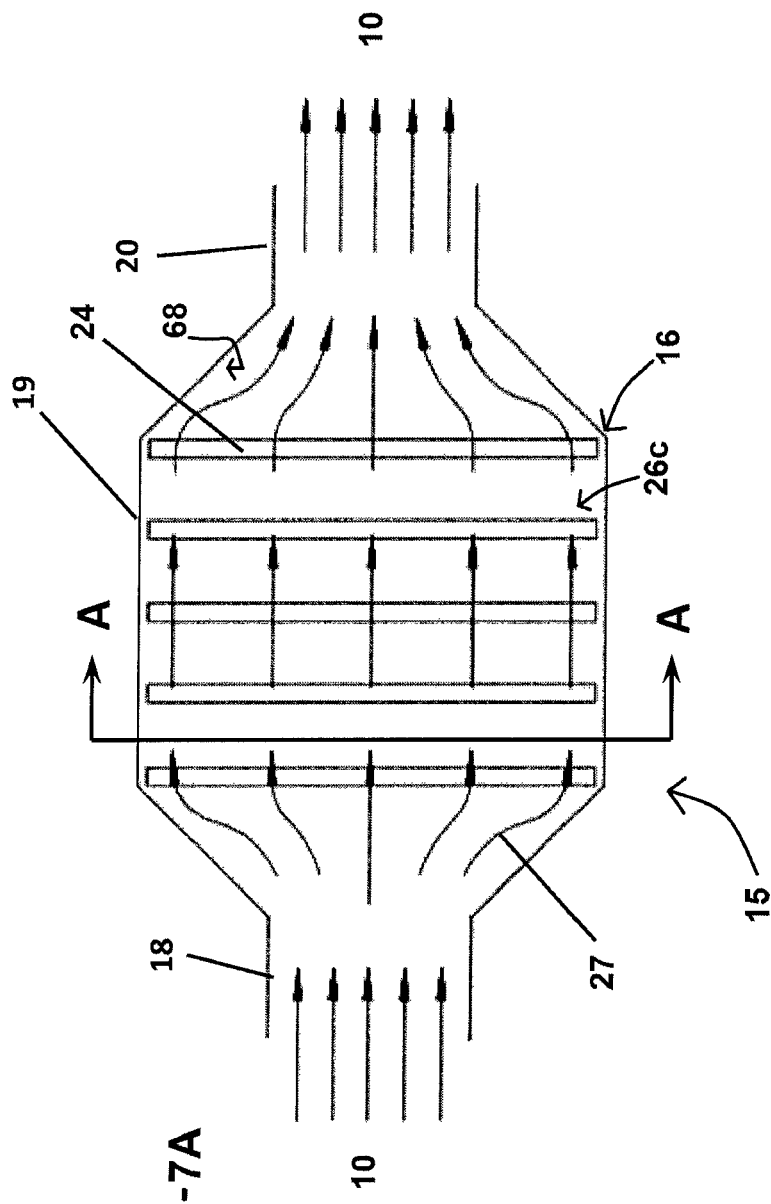
FIG. 7A is a side cross-sectional view of another exemplary reverse venturi apparatus constructed in accordance with the subject disclosure where a plurality of spaced apart baffles are disposed in the enlarged portion of the housing.

With reference to FIGS. 7A-B, the at least one obstruction element 26*a-j* is a plurality of baffles 26*c*. Each baffle 26*c* extends transversely across the enlarged portion 19 of the housing 16 from the interior surface 68 of the enlarged portion 19 of the housing 16. The baffles 26*c* are spaced apart from one another along the central axis 17 and each baffle 26*c* includes orifices 28 that permit the flow of the gaseous emissions 10 through the baffles 26*c*. Of course it should be appreciated that any number of baffles 26*c* are possible, including a configuration containing only a single baffle 26*c*. It should also be appreciated that the size, shape, and number of orifices 28 in each baffle 26*c* may vary. For example, the baffles 26*c* may be provided in the form of a screen, where the orifices 28 are formed between the crossing wires of the screen. The orifices 28 in the baffles 26*c* restrict the flow of the gaseous emissions 10 in the enlarged portion 19 of the housing 16 and thus increase the dwell time of the gaseous emissions 10 in the enlarged portion 19 of the housing 16. This improves the capture and removal of the contaminants from the gaseous emissions 10 by the mass of reactive material 24 forming the baffles 26*c*. In one variation, the baffles 26*c* are made of zinc. Another variation, the baffles 26*c* are made of a non-zinc material that is zinc coated. It should be appreciated that the baffles 26*c* can be replaced and/or cleaned as necessary if they become saturated during operation of the reverse venturi apparatus 15. In yet another variation, the size(s) of the orifices 28 in one of the baffles 26*c* is different than the size(s) of the orifices 28 in an adjacent one of the baffles 26*c*. By using different sizes of orifices 28 in different baffles 26*c*, the flow of gaseous emissions 10 can be accelerated and/or restricted to improve the capture and removal of the contaminants in the gaseous emissions 10 by the mass of reactive material in the baffles 26*c*. In a similar way, the baffles 26*c* need not be equally spaced apart in the enlarged chamber 21, nor do the orifices 28 in one of the baffles 26*c* need to be the same size, shape, or in the same location as the orifices 28 in an adjacent baffle 26*c*. By taking advantage of different sizes, shapes, and locations of the orifices 28 from one of the baffles 26*c* to another and by taking advantage of different spacing of the baffles 26*c*, the dwell time of the gaseous emissions 10 in the enlarged portion 19 of the housing 16 can be increased so as to promote increased contact with the physical and chemical capture and collection sites along the mass of reactive material 24.

In other alternative configurations shown in FIGS. 8-11, the at least one obstruction 26*a-j* may not be fixed to the housing 16 itself, but instead may be freely positioned inside the enlarged portion 19 of the housing 16. In such configurations, the at least one obstruction element 26a-j may include various forms of obstruction media 26d-j. Like obstruction elements 26a-c, the obstruction media 26d-j is capable of being made from zinc or from a non-zinc material that is zinc coated. Zinc is easily melted allowing complex shapes to be cast using normal molding methods, lost wax investment processes, centrifugal processes, and the like. Other construction methods will readily include machining, extrusion, sintering, stamping, hot forging and forming, laser cutting, and the like. Alternatively, steel may be used to create an underlying shape, which is then subsequently coated or plated in zinc as a surface cover. The obstruction media 26d-j can be used to completely fill the entire enlarged chamber 21, partially fill the enlarged chamber 21, or fill in between the baffles 26c previously described in connection with FIGS. 7A-B.

Figure 8:
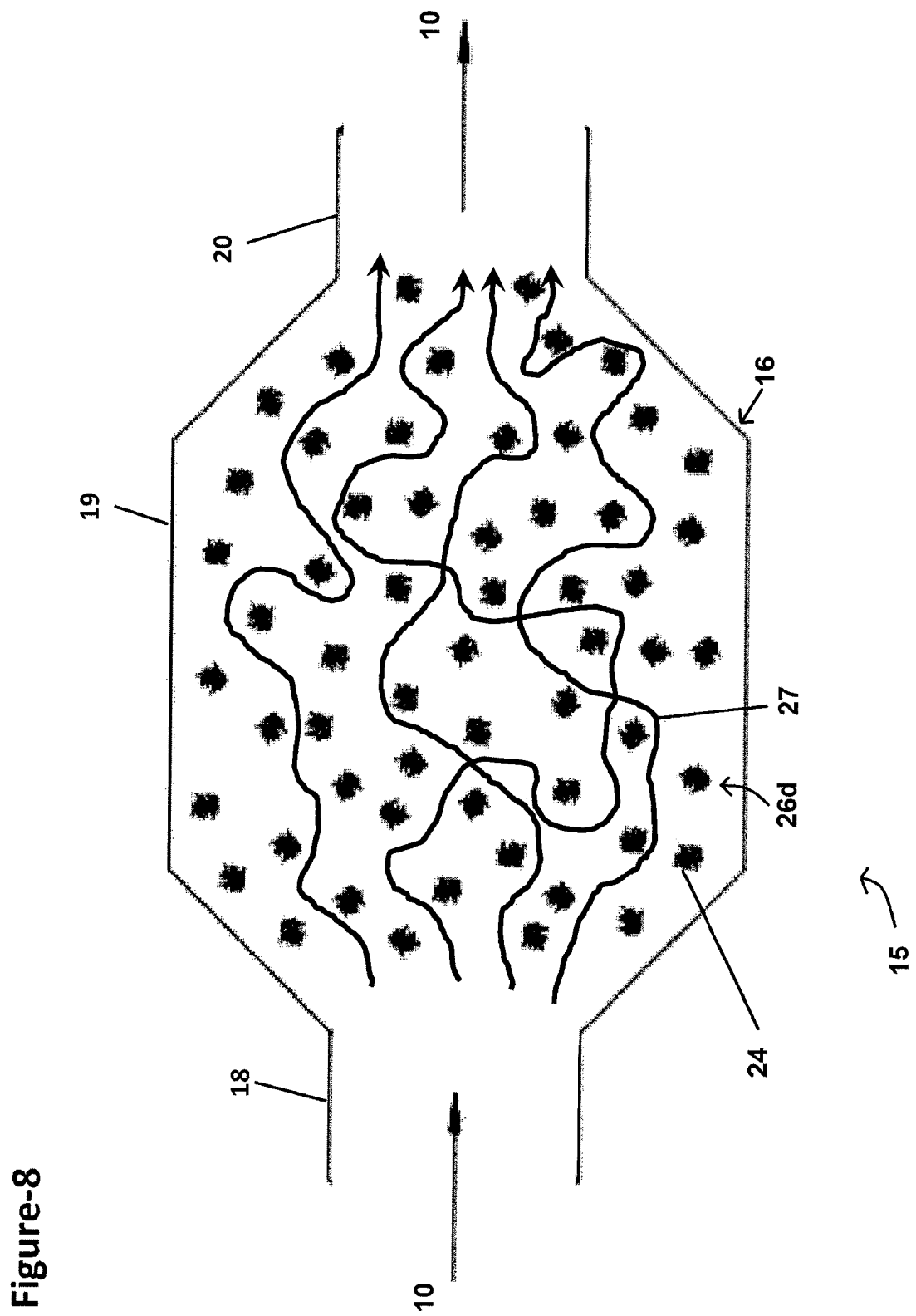
FIG. 8 is a side cross-sectional view of another exemplary reverse venturi apparatus constructed in accordance with the subject disclosure where a plurality of fragments are disposed in the enlarged portion of the housing.

FIG. 8 illustrates a configuration where the at least one obstruction element 26a-j is a plurality of fragments 26d that are contained in the enlarged portion 19 of the housing 16. In accordance with this configuration, the gaseous emissions 10 pass through the spaces between adjacent fragments 26d as the gaseous emissions 10 travel through the enlarged portion 19 of the housing 16 from the entry portion 18 to the exit portion 20 of the housing 16. To this end, the plurality of fragments 26d may be provided with an irregular shape such that the fragments 26d loosely pack with each other in the enlarged portion 19 of the housing 16. In one non-limiting example, the plurality of fragments 26d may be made of mossy zinc. Mossy zinc is popcorn shaped zinc construction that is produced by dipping molten zinc into a cooling liquid such as water. The resulting drip of molten zinc solidifies into a relatively small spheroidal structure with extremely high surface area to volume ratios. In addition, the surface area of the resultant structure has a moss-like surface texture. These structures can be produced in a range of sizes for application specific uses. Some steel processes can produce steel versions of complex spheroidal structures similar to mossy zinc, which may be zinc coated.

The loose pack nature of the plurality of fragments 26d in FIG. 8 gives the tortuous flow path 27 a random shape, which increases the dwell time of the gaseous emissions 10 in the enlarged portion 19 of the housing 16. This in turn improves the capture and removal of the contaminants from the gaseous emissions 10 by the mass of reactive material 24 forming the plurality of fragments 26d. The plurality of fragments 26d in FIG. 8 can be replaced and/or cleaned as necessary if they become saturated during the operation of the reverse venturi apparatus 15.

Figure 9:
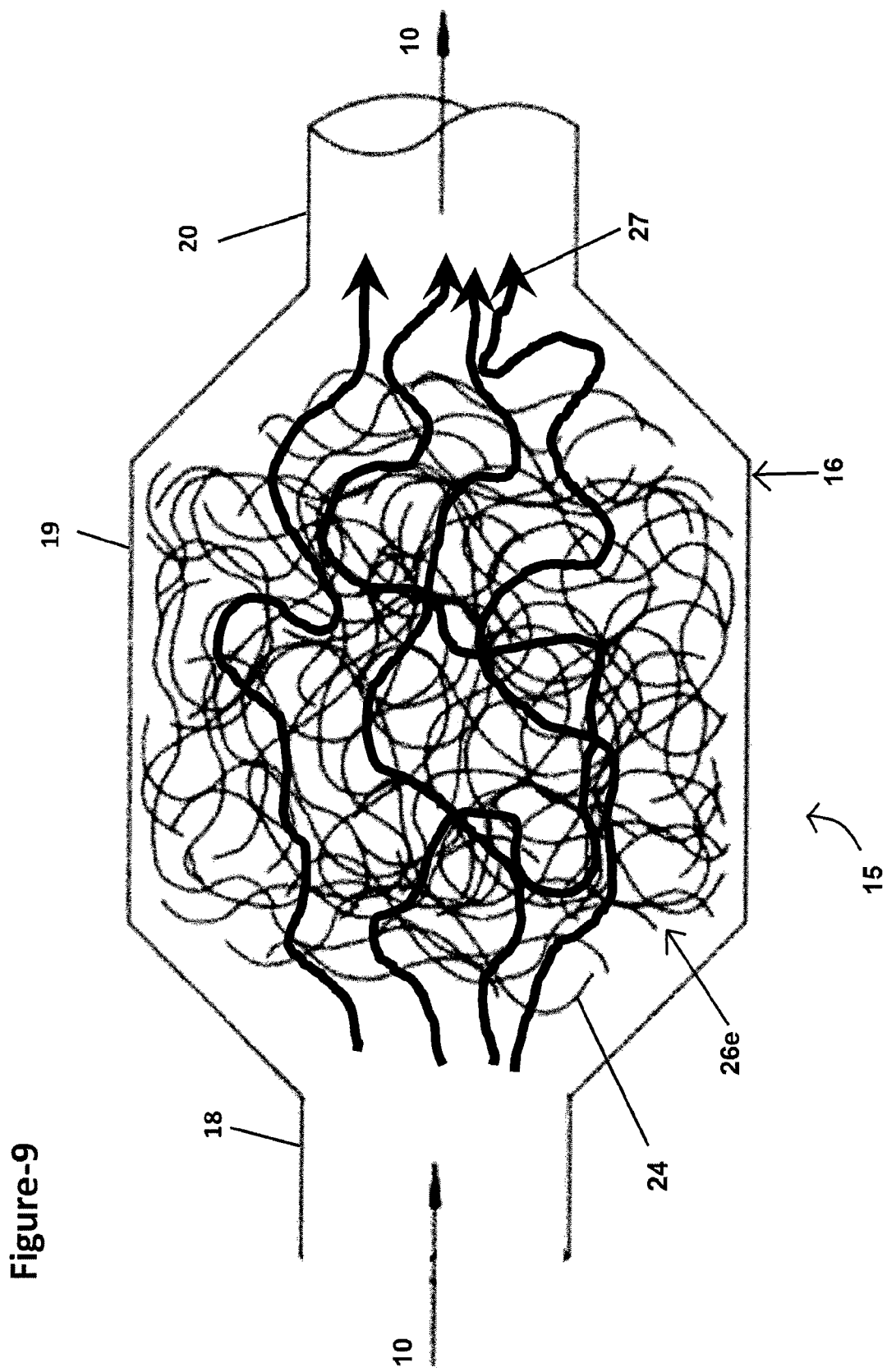
FIG. 9 is a side cross-sectional view of another exemplary reverse venturi apparatus constructed in accordance with the subject disclosure where a plurality of entangled strands are disposed in the enlarged portion of the housing forming a wool-like material therein.

In another alternative configuration shown in FIG. 9, the at least one obstruction element 26a-j is a plurality of entangled strands 26e that are disposed in the enlarged portion 19 of the housing 16. The plurality of entangled strands 26e thus form a wool-like material in the enlarged portion 19 of the housing 16. In accordance with one possible configuration, the plurality of entangled strands 26e are folded and crumpled like steel wool to form a mass with a very large surface area. The entangled strands 26e themselves may be of the same composition, thickness, and length or alternatively may be a mixture of different compositions, thicknesses, and/or lengths. In one variation, the plurality of entangled strands 26e are made from zinc wire and are randomly entangled to form a zinc wool. The zinc wool can be produced with varying levels of density and/or sizes of wire so as to provide specific flow restriction capabilities. In another variation, the plurality of entangled strands 26e are made from steel wire and are randomly entangled to form a steel wool. The steel wool may be zinc coated. The relatively loose packed nature of the plurality of entangled strands 26e in FIG. 9 gives the tortuous flow path 27 a random shape, which increases the dwell time of the gaseous emissions 10 passing through the enlarged portion 19 of the housing 16. This in turn improves the capture and removal of the contaminants in the gaseous emissions 10 by the mass of reactive material 24 forming the plurality of entangled strands 26e. It should be appreciated that the plurality of entangled strands 26e can be replaced and/or cleaned as necessary if they become saturated during operation of the reverse venturi apparatus 15.

Figure 10:
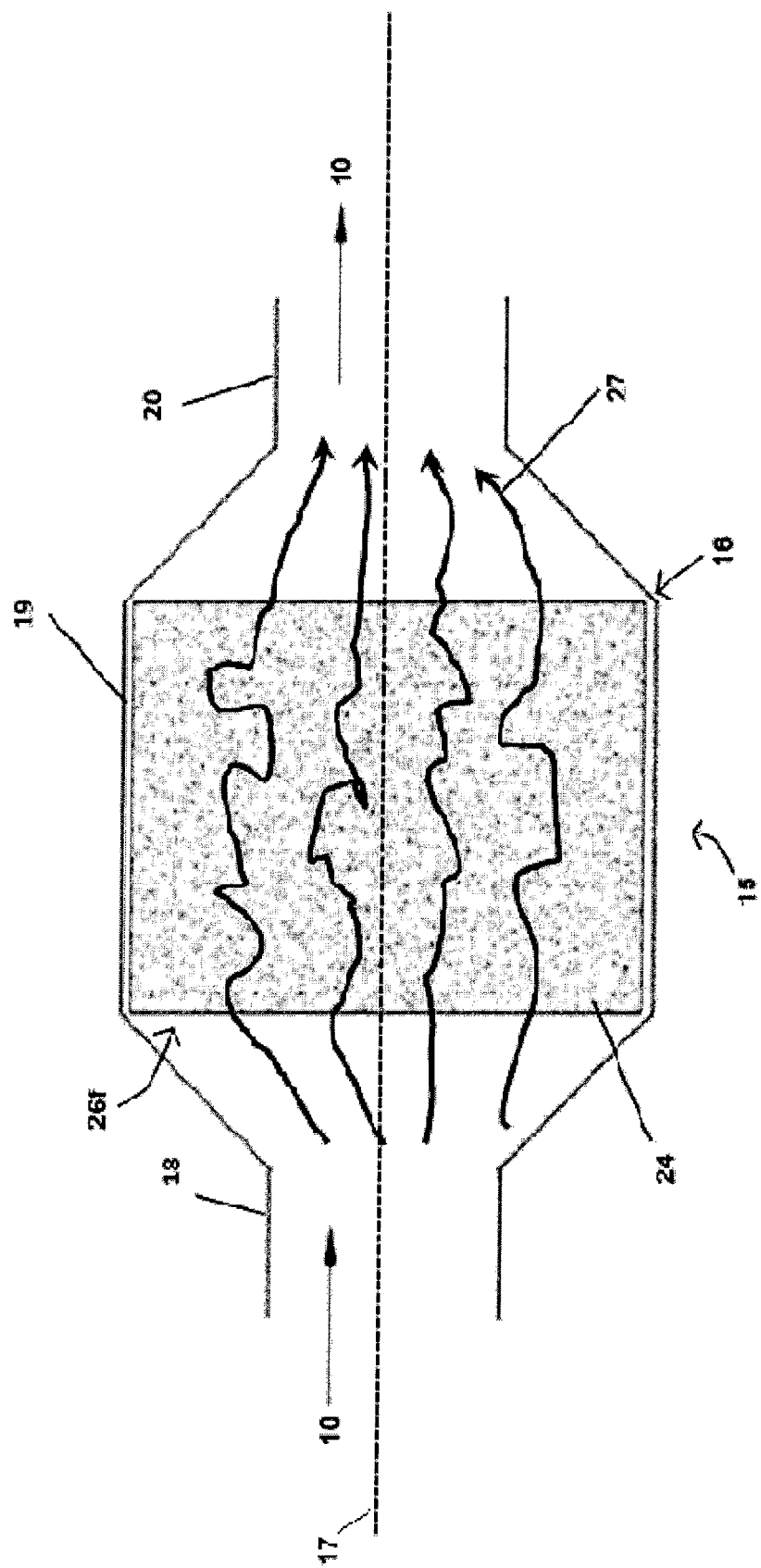
FIG. 10 is a side cross-sectional view of another exemplary reverse venturi apparatus constructed in accordance with the subject disclosure where a filter element is disposed in the enlarged portion of the housing.

With reference to FIG. 10, another alternative configuration is illustrated where the at least one obstruction element 26a-j is a filter element 26f. The filter element 26f extends transversely across the enlarged portion 19 of the housing 16 relative to the central axis 17. The filter element 26f is porous such that the pores in the filter element 26f allow the gaseous emissions 10 to pass through the filter element 26f as the gaseous emissions 10 flow through the enlarged portion 19 of the housing 16 from the entry portion 18 to the exit portion 20 of the housing 16. The arrangement of the filter element 26f, which may be made of a sintered metal, gives the tortuous flow path 27 a random shape, which increases the dwell time of the gaseous emissions 10 passing through the enlarged portion 19 of the housing 16. This in turn improves the capture and removal of the contaminants in the gaseous emissions 10 by the mass of reactive material 24 forming the filter element 26f. The sintered metal of the filter element 26f is preferably made of zinc or a non-zinc material that is zinc coated. It should be appreciated that the filter element 26f can be replaced and/or cleaned as necessary if it becomes saturated during operation of the reverse venturi apparatus 15.

Figure 11:
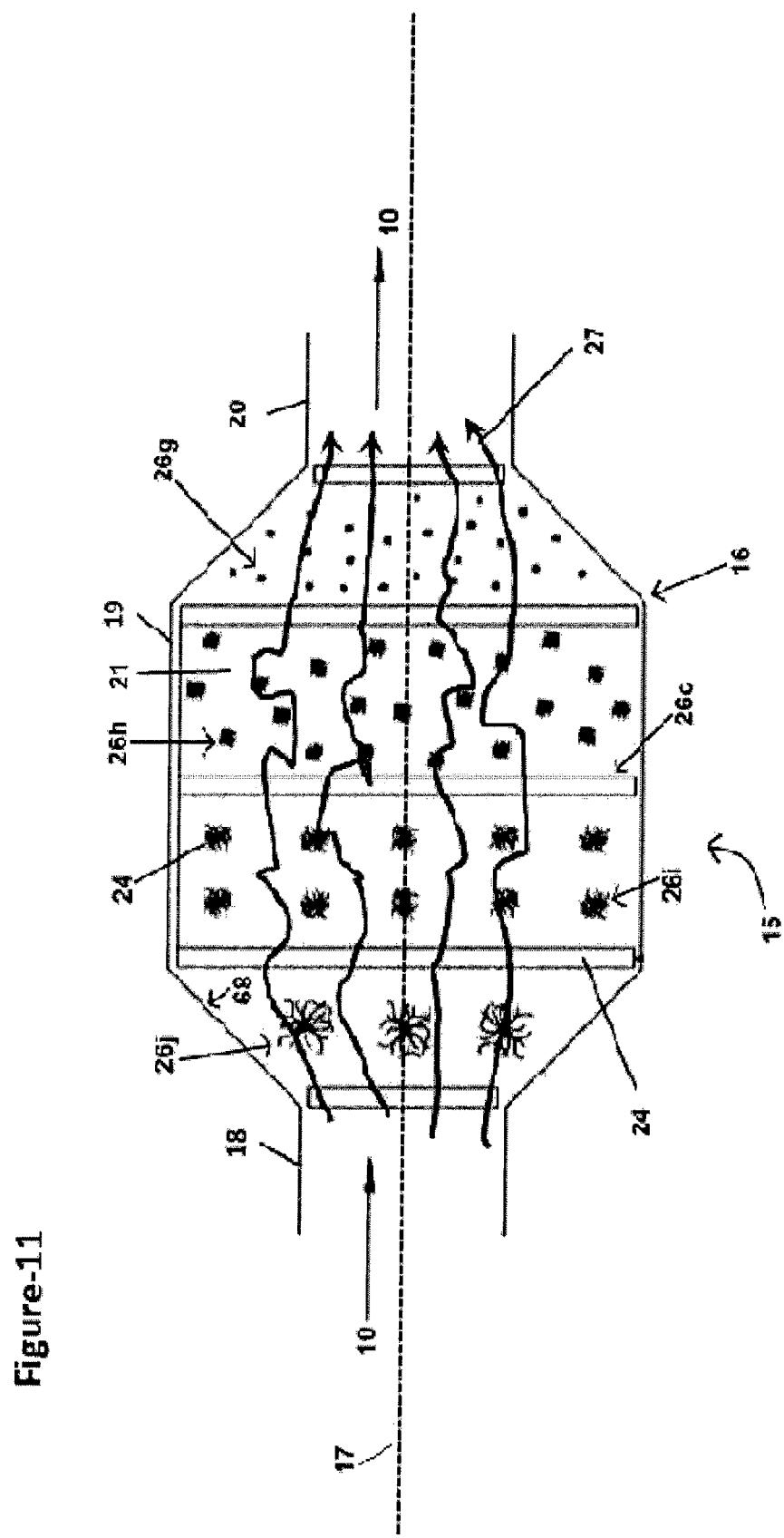
FIG. 11 is a side cross-sectional view of another exemplary reverse venturi apparatus constructed in accordance with the subject disclosure where the enlarged portion of the housing contains a plurality of baffles and a plurality of fragments of varying sizes that are disposed in between adjacent baffles.
Figure 12A:
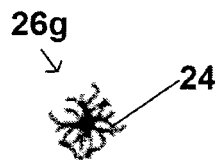
FIG. 12A is a front elevation view showing one exemplary size of the fragments contained in the enlarged portion of the housing of the exemplary reverse venturi apparatus illustrated in FIG. 11.
Figure 12B:
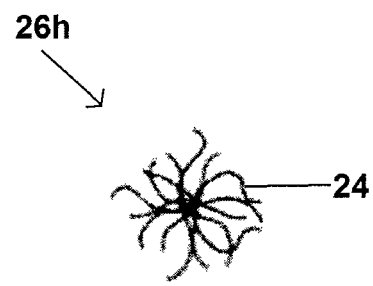
FIG. 12B is a front elevation view showing another exemplary size of the fragments contained in the enlarged portion of the housing of the exemplary reverse venturi apparatus illustrated in FIG. 11.
Figure 12C:
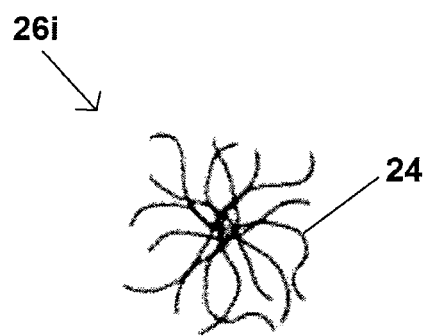
FIG. 12C is a front elevation view showing another exemplary size of the fragments contained in the enlarged portion of the housing of the exemplary reverse venturi apparatus illustrated in FIG. 11.
Figure 12D:
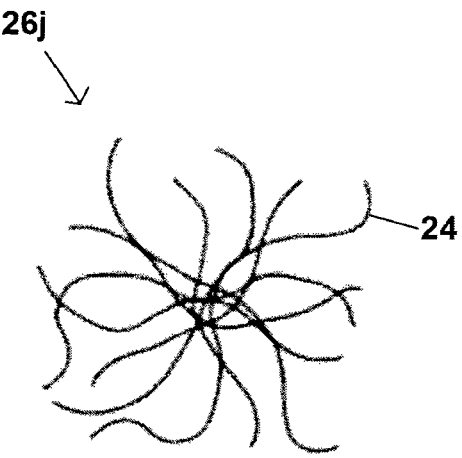
FIG. 12D is a front elevation view showing another exemplary size of the fragments contained in the enlarged portion of the housing of the exemplary reverse venturi apparatus illustrated in FIG. 11.

Referring to FIG. 11, the at least one obstruction element 26a-j is illustrated as a combination of the plurality of baffles 26c shown in FIGS. 7A-B and a plurality of fragments 26g-j, which have different sizes and which are similar to the plurality of fragments 26d shown in FIG. 8. In accordance with this alternative configuration, the plurality of baffles 26c and the plurality of fragments 26g-j are disposed in the enlarged portion 19 of the housing 16. Like in FIGS. 7A-B, the plurality of baffles 26c illustrated in FIG. 11 extend transversely across the enlarged portion 19 of the housing 16 from the interior surface 68 of the enlarged portion 19 of the housing 16. Additionally, the plurality of baffles 26c are spaced apart relative to one another along the central axis 17 such that the baffles 26c divide the enlarged chamber 21 into multiple sections. Orifices 28 in each of the baffles 26c permit the flow of the gaseous emissions 10 through the baffles 26c. The plurality of fragments 26g-j are disposed between adjacent baffles 26c (i.e. are disposed in the multiple sections of the enlarged chamber 21).

As illustrated in FIG. 11 and in FIGS. 12A-D, the plurality of fragments 26g-j are form the mass of reactive material 24. The plurality of fragments 26g-j may be provided in different sizes where the plurality of fragments 26g-j are grouped by similar size (i.e. fragments 26g, 26h, 26i, and 26j are in separate groups) and are separated from fragments of another size by the baffles 26c. For example, the groups of fragments 26g-j may be arranged such that the size of the fragments 26g-j decreases moving away from the entry portion 18 of the housing 16 and toward the exit portion 20 of the housing 16. In other words, the size of the fragments 26g-j in the various groups may be graduated and decreasing moving in an overall flow direction of the gaseous emissions 10 in the enlarged portion 19 of the housing 16. In one variation, the fragments 26g-j are made of zinc. For example, the fragments 26g-j may be formed by dripping molten zinc into a cooling liquid to create a popcorn-like structure with an exceptionally large surface area and a random, moss-like surface texture. It should be appreciated that in another variation, different sized fragments 26g-j may be mixed together and therefore are not separated into groups based on size.

Figure 13A:
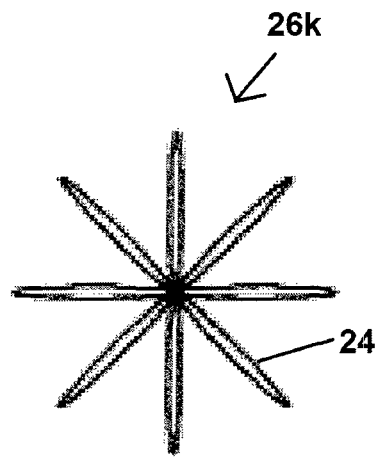
FIG. 13A is a front elevation view showing one exemplary piece of loose material with an asterisk-like shape that in combination with other pieces may be used to replace the fragments shown in the exemplary reverse venturi apparatus illustrated in FIGS. 8 and 11.
Figure 13B:
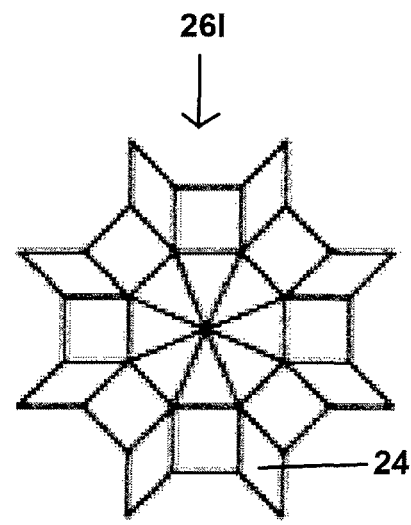
FIG. 13B is a front elevation view showing one exemplary crystalline flake that in combination with other crystalline flakes may be used to replace the fragments shown in the exemplary reverse venturi apparatus illustrated in FIGS. 8 and 11.
Figure 13C:
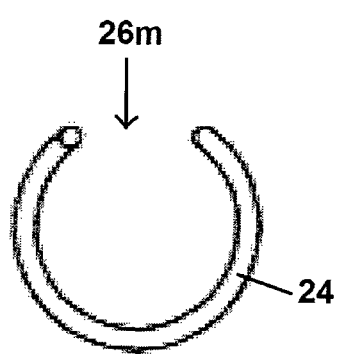
FIG. 13C is a front elevation view showing one exemplary wire coil that in combination with other wire coils may be used to replace the fragments shown in the exemplary reverse venturi apparatus illustrated in FIGS. 8 and 11.

As FIGS. 13A-C illustrate, several alternative shaped obstruction elements 26k-m are shown in the form of a loose material, which may be used in addition to or instead of the plurality of fragments 26d and 26g-j shown in FIGS. 8 and 11. FIG. 13A illustrates an example where the obstruction 26k forms the mass of reactive material 24 and has an asterisk-like shape, which is similar to the shape of the child's toy called "Jacks". FIG. 13B illustrates another example where the alternative shaped obstruction element 26k-m is a plurality of crystalline flakes 261 (one shown) that form the mass of reactive material 24 and that may be positioned in the enlarged portion 19 of the housing 16 like the fragments 26d and 26g-j shown in FIGS. 8 and 11. The crystalline flakes 261 have a shape that is similar to that of a snowflake. FIG. 13C illustrates yet another example where the alternative shaped obstruction element 26k-m is a plurality of wire coils 26m (one shown) that form the mass of reactive material 24 and that may be positioned in the enlarged portion 19 of the housing 16 like the fragments 26d and 26g-j shown in FIGS. 8 and 11. It should be appreciated that obstructions 26k and the plurality of crystalline flakes 261 may be made of zinc or a non-zinc material that is zinc coated using various processes, including without limitation, lost wax forging and 3D printing. The plurality of wire coils 26m may be made, for example, by wrapping zinc wire around a mandrel core similar to the shape of a spring, except after winding around the mandrel core the entire coil of wrapped wire is slit along the length of the mandrel core so that individual rings of coil are generated. It should also be appreciated that the alternative shaped obstruction elements 26k-m may or may not completely fill the enlarged chamber 21.

It should be appreciated that the various types of obstruction elements 26a-k described above can be mixed and matched to create various combinations. Examples of mixing and matching include combining one or more baffles 26a-c shown in FIGS. 5, 6A-B, and 7A-B with the plurality of fragments 26d and 26g-j shown in FIGS. 8 and 11. Other examples of mixing and matching include combining the plurality of entangled strands 26e shown in FIG. 9 with the plurality of fragments 26d and 26g-j shown in FIGS. 8 and 11. Other alternative configurations are possible that combine the various types of obstruction elements 26a-k described above with other filter materials such as activated carbon. Activated carbon collects contaminants like a sponge and by surface contact. Therefore, limited quantities of activated carbon can be introduced into the enlarged portion 19 of the housing 16 to act in conjunction with the various types of obstruction elements 26a-k described above. Advantageous, the obstruction elements 26a-k would hold the activated carbon in the enlarged portion 19 of the housing 16 so that the activated carbon is disposed relatively statically throughout the enlarged chamber 21. This scenario is opposite to typical emission control systems, which release activated carbon into the flow of gaseous emissions 10. Because the activated carbon is not free to flow with the gaseous emissions a more efficient use of activated carbon is possible. Those skilled in the art will readily appreciate that the disclosed variations of the reverse venturi apparatus 15 are merely exemplary and that many combinations well beyond the few examples disclosed herein are possible and desirable to address specific applications.

Figure 14:
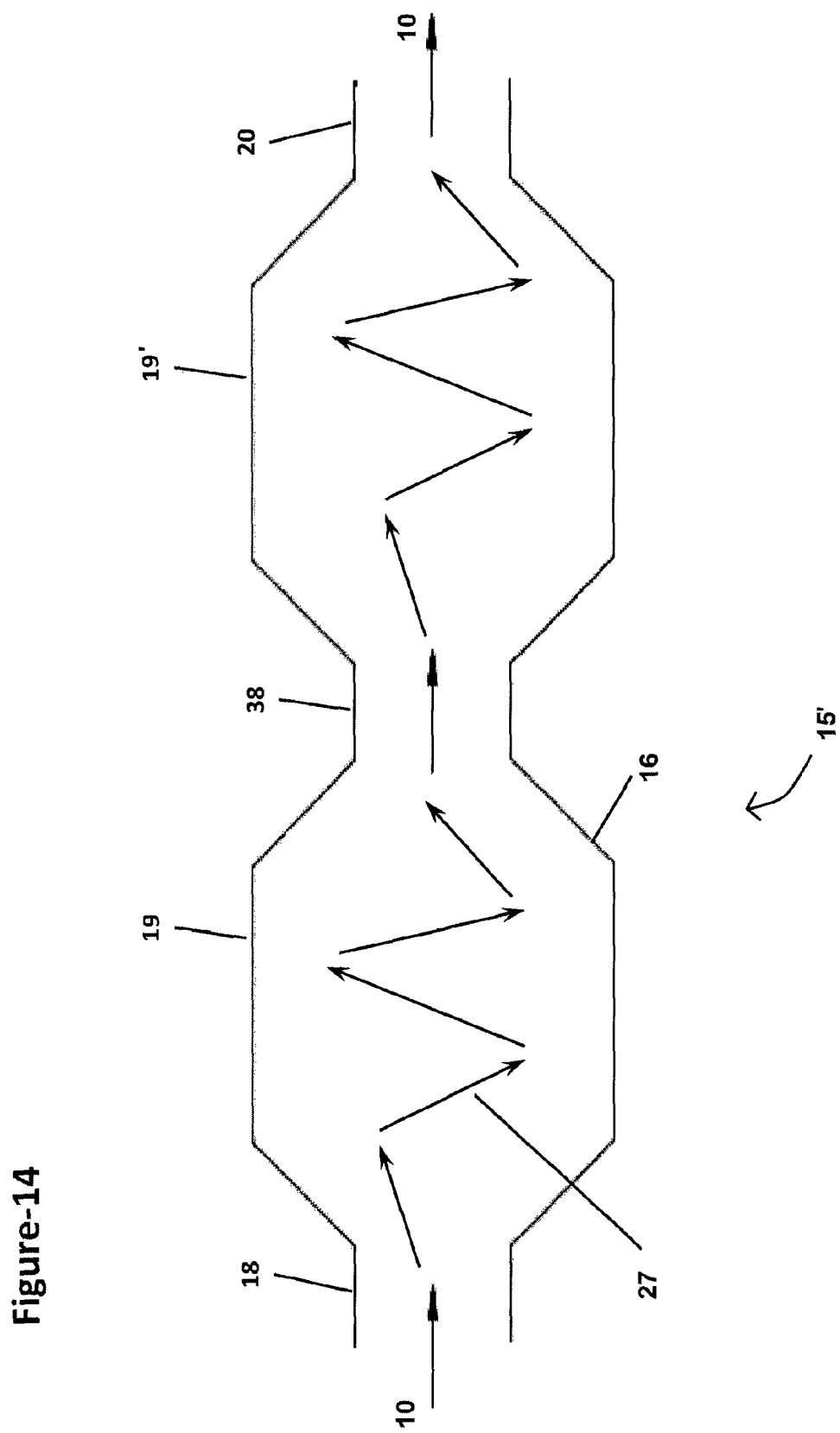
FIG. 14 is a side cross-sectional view showing another exemplary reverse venturi apparatus constructed in accordance with the subject disclosure that includes two separate enlarged portions that are joined together in series.

With reference to FIG. 14, another exemplary reverse venturi apparatus 15' is illustrated that includes two enlarged portions 19, 19' that are joined together in series by conduit 38. One enlarged portion 19 of the housing 16 extends between the entry portion 18 of the housing 16 and the conduit 38 while the other enlarged portion 19' extends between the conduit 38 and the exit portion 20 of the housing 16. Thus, the tortuous flow path 27 for the gaseous emissions 10 is elongated. In accordance with this configuration, the gaseous emissions 10 are routed from enlarged portion 19 through conduit 38 and to enlarged portion 19' where additional contaminants are collected and/or captured. It should also be appreciated that the subject disclosure is not limited to using just one or two enlarged portions 19, 19' in series, because some applications with an extensive volume of emissions and/or heavy contamination levels may require numerous enlarged portions connected together in series.

Figure 15:
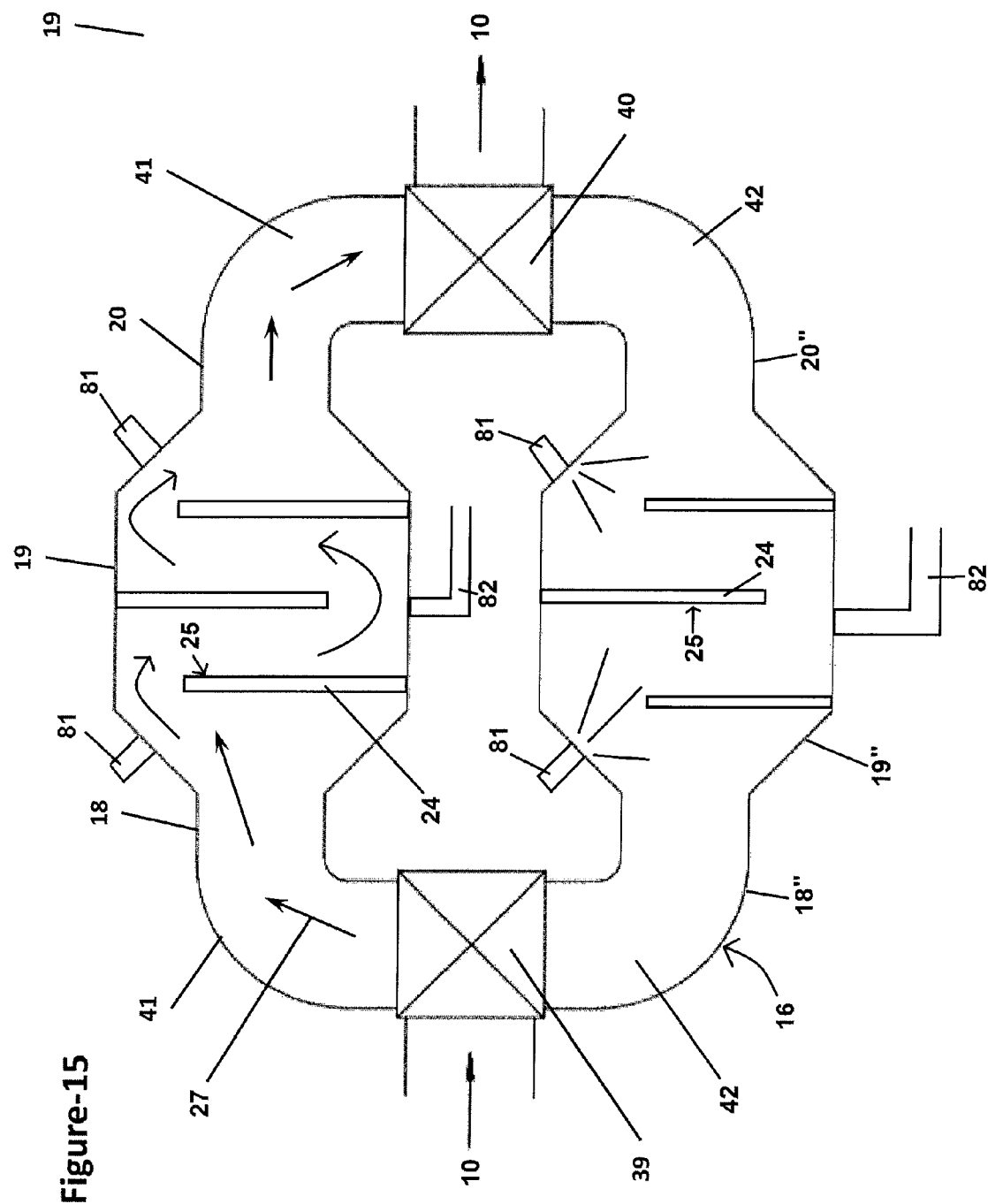
FIG. 15 is a side cross-sectional view showing another exemplary reverse venturi apparatus constructed in accordance with the subject disclosure that includes two separate enlarged portions that are joined together in parallel.

Referring to FIG. 15, another exemplary reverse venturi apparatus 15" is illustrated that includes two enlarged portions 19, 19" that are joined together in parallel. A 3-way inlet valve 39 controls the flow of gaseous emissions 10, directing the gaseous emissions 10 into and through either conduit 41 or conduit 42. A 3-way outlet valve 40 directs the gaseous emissions 10 to exit from either conduit 41 or conduit 42 without back-flowing directly from conduit 41 into conduit 42, or vice versa. The gaseous emissions 10 enter enlarged portion 19 through entry portion 18 and exit through exit portion 20 when the gaseous emissions 10 are routed through conduit 41. The gaseous emissions 10 enter enlarged portion 19" through entry portion 18" and exit through exit portion 20" when the gaseous emissions 10 are routed through conduit 42. One benefit of the reverse venturi apparatus 15" shown in FIG. 15 is that when one of the enlarged portions 19, 19" requires maintenance, servicing, or cleaning, it can be isolated and taken off-line without shutting down the entire system, because the other one of the enlarged portions 19, 19" can remains in service.

Over time, the chemical reactions occurring on the reactive outer surface 25 of the mass of reactive material 24 and/or the physical capture of contaminants may lead to a saturation point for the mass of reactive material 24 wherein the efficiency of the reverse venturi apparatus 15 is reduced. The arrangement shown in FIG. 15 therefore allows for the removal, replacement, and/or cleaning of the mass of reactive material 24 in the enlarged portions 19, 19" of the housing 16 to restore the reverse venturi apparatus to pre-saturation efficiency performance without requiring a complete shutdown.

The process of contaminant removal from the saturated mass of reactive material will specifically depend upon the type of contaminants and the type of amalgam forming metal being used. Access to the enlarged chambers 21, 21", which are disposed inside the enlarged portions 19, 19" of the housing 16 will be commensurate with the type of obstruction used. When relatively small loose obstructions are used, a pouring and/or draining type access will be required. If the obstructions are relatively large blocks, plates, baffles, or assemblies, then appropriate lifting and handling methods and access will be required.

Still referring to FIG. 15, the reverse venturi apparatus 15 may include one or more spray nozzles 81 that are disposed in fluid communication with the enlarged portions 19, 19" of the housing 16. The spray nozzles 81 are positioned to spray a deoxidizing acid over the mass of reactive material 24 in the enlarged portions 19, 19" of the housing 16. In operation, the deoxidizing acid washes the mass of reactive material 24 of the contaminants in order to rejuvenate the mass of reactive material 24. Optionally, drains 82 may be disposed in fluid communication with the enlarged portions 19, 19" of the housing 16 to transport the solution of used deoxidizing acid and contaminants away from the enlarged portions 19, 19" of the housing 16. Advantageously, saturated zinc, whether it is a coating on steel, or a solid zinc structure, can be recycled and reclaimed. Therefore, the material used in the obstructions can be reused and reclaimed. In addition, many of the contaminants which are captured, especially the heavy metals such as mercury, may be able to be reused and reclaimed in lighting and chlorine manufacture.

Figure 16:
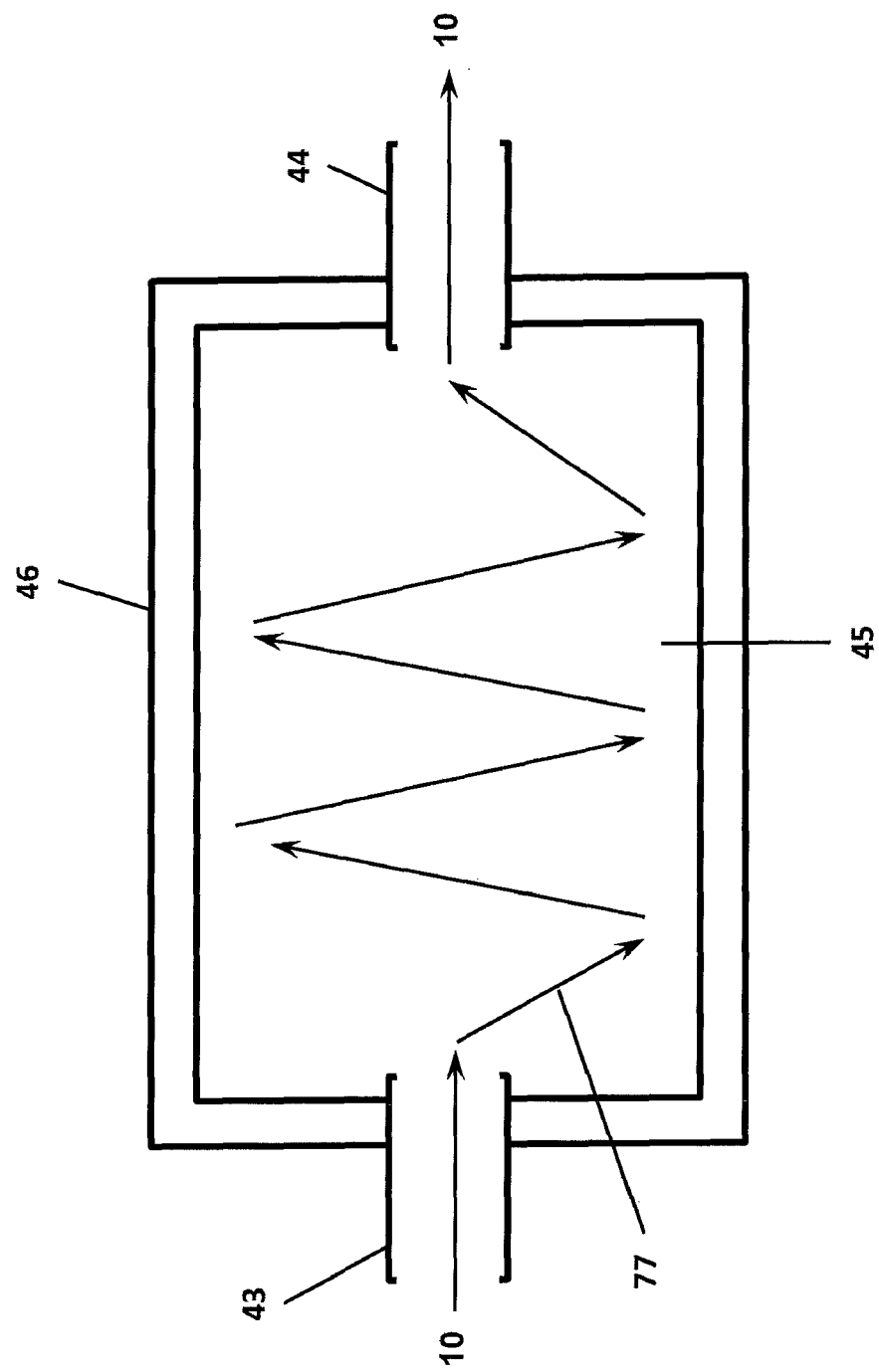
FIG. 16 is a side cross-sectional view showing another exemplary reverse venturi apparatus constructed in accordance with the subject disclosure.

With reference to FIG. 16, another exemplary reverse venturi apparatus 15 is illustrated where the enlarged chamber 45 has a significantly larger volume compared to the volume of entrance conduit 43 and exiting conduit 44. The enlarged portion 46 can be round, square, triangular, oval, or virtually any one of many shapes as may be desired (where a rectangular shape is shown), in order to achieve an enlarged tortuous flow path 77 for the gaseous emissions flowing through the enlarged portion 46.

Figure 17:
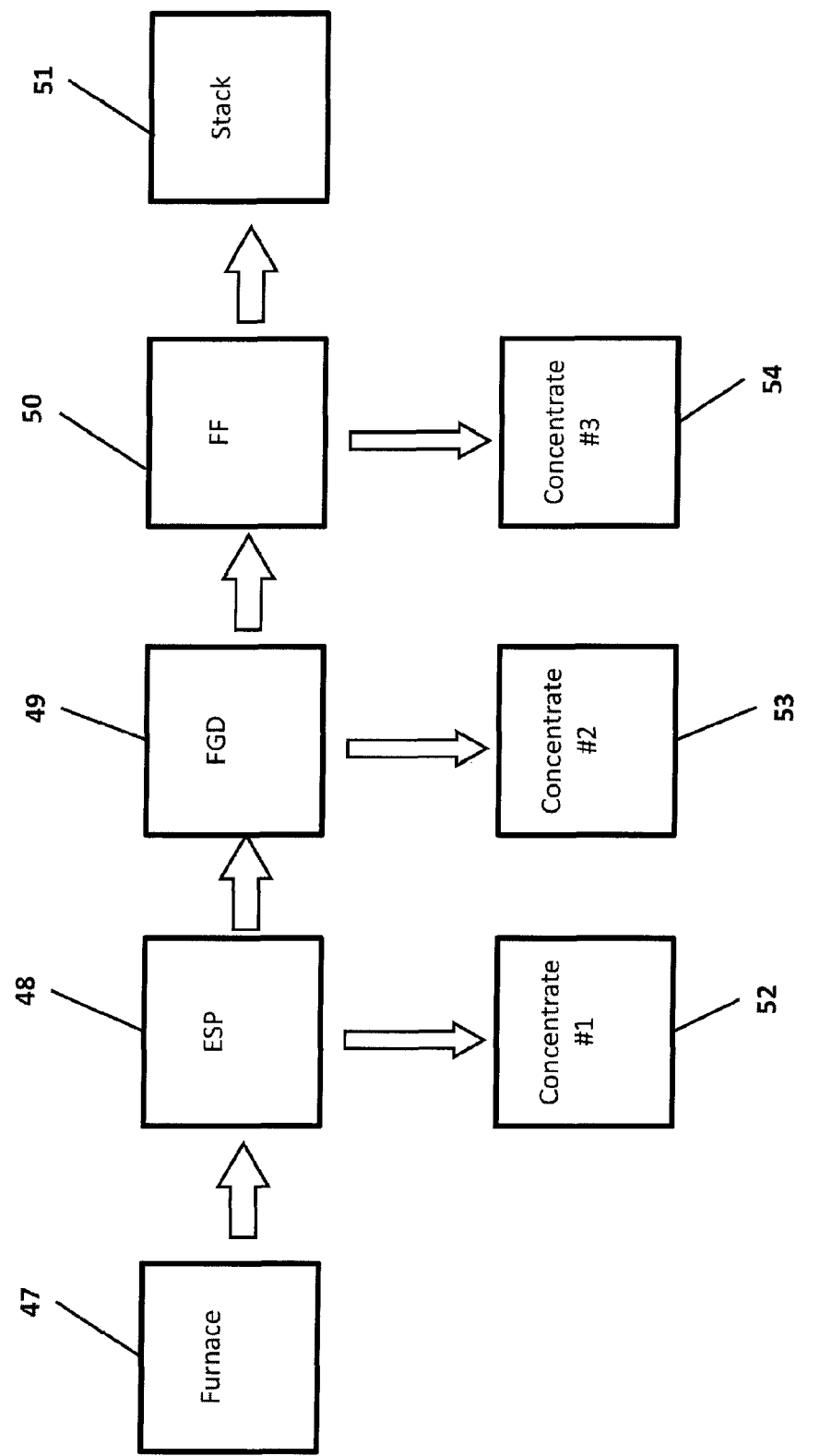
FIG. 17 is a block flow diagram illustrating a known method for removing contaminants from gaseous emissions.

With reference to FIG. 17, a block diagram of a typical gaseous emission control system is shown. Gaseous emissions are routed from a furnace 47 to an electrostatic precipitator (ESP) 48, and then to a fluidized gas desulfurization (FGD) unit 49, and then through a fabric filter (FF) unit 50, before being released to atmosphere through a stack 51. A first concentrate 52 of contaminants is removed from the gaseous emissions at the ESP 48. In a similar fashion, a second concentrate 53 of contaminants is removed from the gaseous emissions at the FGD unit 49. The second concentrate 53 produced by the FGD unit 49, which often contains mercury and other heavy metals, is typically diverted into wastewater. A third concentrate 54 of contaminants is removed from the gaseous emissions at the FF unit 50.

In the end, the final emissions released to atmosphere are still not capable of meeting the EPA emissions regulations and requirements. Allowable EPA emissions require at least 90% removal of hazardous contaminants while current typical emissions control systems are only capable of 88%-90% removal of hazardous contaminants. A major problem for industries with contaminated emissions is that the regulations governing the emissions will become much more restrictive over time, while current emissions control technology has potentially reached its limit. As such, the pace of ongoing technological improvements has not been able to keep up with the pace of ever more restrictive emissions regulations.

Figure 18A:
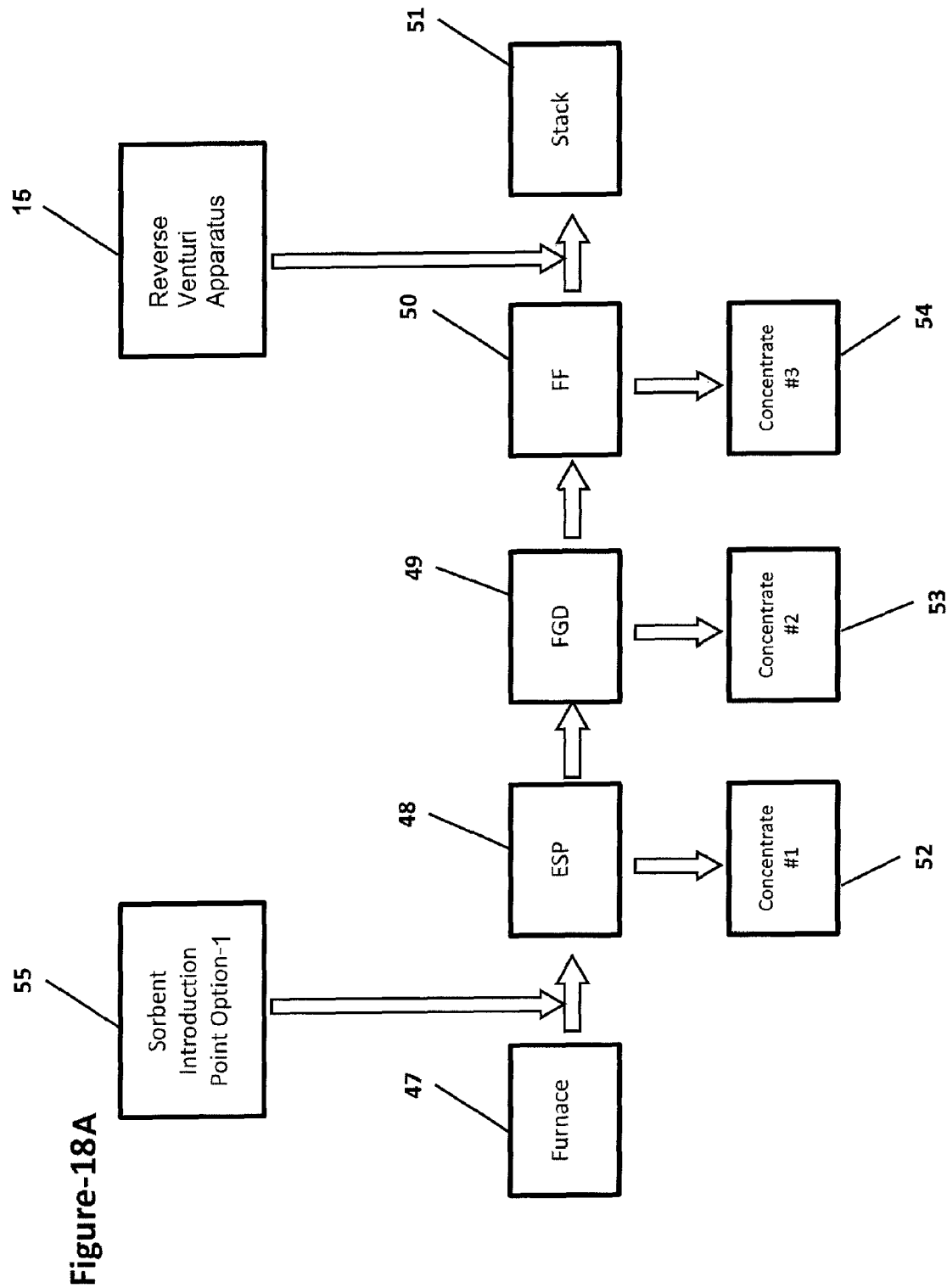
FIG. 18A is a block diagram illustrating the method for removing contaminants from gaseous emissions illustrated in FIG. 17 where the method has been modified by adding steps for injecting a sorbent into the gaseous emissions at a first introduction point and subsequently passing the gaseous emissions through a reverse venturi apparatus.
Figure 18B:
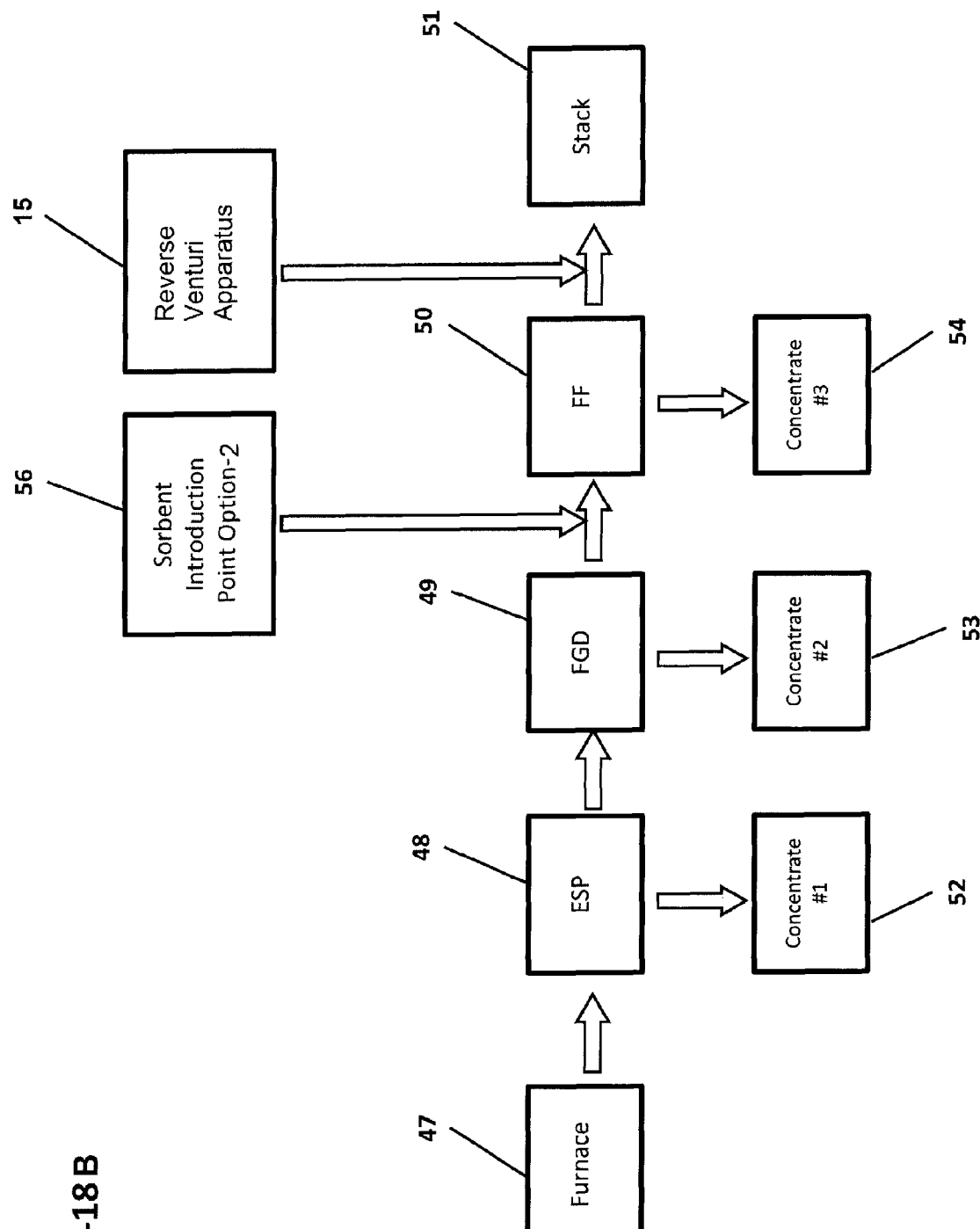
FIG. 18B is a block diagram illustrating the method for removing contaminants from gaseous emissions illustrated in FIG. 17 where the method has been modified by adding steps for injecting the sorbent into the gaseous emissions at a second introduction point and subsequently passing the gaseous emissions through the reverse venturi apparatus.

With reference to FIGS. 18A-B, the block diagram of FIG. 17 has been modified with introduction point options for sorbent injection and an additional step has been added where the gaseous emissions are passed through the reverse venturi apparatus 15 described above. In FIG. 18A, a first sorbent introduction point 55 is shown positioned between the furnace 47 and the ESP 48. Alternatively, in FIG. 18B, a second sorbent induction point 56 is shown positioned between the FDG unit 49 and the FF unit 50. Which option is deemed to be best for sorbent will be dependent upon the existing configuration and condition of the plant. There are numerous other introduction points and/or combinations of introduction points where the sorbent can be introduced other than the two options depicted in FIGS. 18A-B, therefore these two options are illustrated for demonstrative purposes. The reverse venturi apparatus 15 in FIGS. 18A-B is located after the FF unit 50 and before the stack 51. The reverse venturi apparatus 15 can be constructed in accordance with any of the aforementioned examples described above, as may be appropriate for various applications. In the end, the final gaseous emissions released to atmosphere through the stack 51 after exiting the reverse venturi apparatus 15 will be capable of meeting and exceeding current and future EPA emissions regulations and requirements.

The method illustrated by FIGS. 18A-B includes the steps of burning a fuel in the furnace 47 to generate gaseous emissions that contain contaminants, routing the gaseous emissions from the furnace 47 to the ESP 48, and removing a first portion particulate contaminants in the gaseous emissions using the ESP 48. In accordance with the step of removing a first portion particulate contaminants in the gaseous emissions using the ESP 48, the first concentrate 52 is formed, which contains the first portion of particulate contaminants that have been removed from the gaseous emissions by the ESP 48. It should be understood that in operation, the ESP 48 utilizes an induced electrostatic charge to remove fine contaminant particles from the gaseous emissions. The method also includes the steps of routing the gaseous emissions from the ESP 48 to the FDG unit 49 and removing sulfur dioxide contaminants in the gaseous emissions using the FDG unit 49. In accordance with the step of removing sulfur dioxide contaminants in the gaseous emissions using the FDG unit 49, the second concentrate 53 is formed containing the sulfur dioxide contaminants that have been removed from the gaseous emissions by the FDG unit 49. The method further includes the steps of routing the gaseous emissions from the FDG unit 49 to the FF unit 50 (i.e. a bag house) and removing a second portion of particulate contaminants in the gaseous emissions using the FF unit 50. In accordance with the step of removing a second portion of particulate contaminants in the gaseous emissions using the FF unit 50, the third concentrate 54 is formed containing the second portion of particulate contaminants that have been removed from the gaseous emissions by the FF unit 50. It should be understood that in operation, contaminant particles are removed from the gaseous emissions when the gaseous emissions pass through the one or more fabric filters (not shown) of the FF unit 50.

In accordance with the subject disclosure, the method further includes the steps of routing the gaseous emissions from the FF unit 50 to the reverse venturi apparatus 15 and removing heavy metal contaminants in the gaseous emissions using the reverse venturi apparatus 15. In accordance with the step of removing heavy metal contaminants in the gaseous emissions using the reverse venturi apparatus 15, the gaseous emissions pass by (i.e. flow over) the mass of reactive material disposed in the reverse venturi apparatus 15. The amalgam forming metal in the mass of reactive material chemically binds with the heavy metal contaminants in the gaseous emissions. Accordingly, the mass of reactive material traps the heavy metal contaminants in the reverse venturi apparatus 15 when the heavy metal contaminants bind to the amalgam forming metal in the mass of reactive material. The method may then proceed with routing the gaseous emissions from the reverse venturi apparatus 15 to a stack 51 that vents the gaseous emissions to the surrounding atmosphere. It should also be appreciated that the reverse venturi apparatus 15 advantageously has a relatively small equipment footprint, allowing it to be easily installed as a retrofit in line between the emission control devices 48, 49, 50 of existing systems and the stack 51 to atmosphere.

Optionally, the method may include the step of injecting a sorbent into the gaseous emissions. In accordance with this step and as shown in FIG. 18A, the sorbent may be injected into the gaseous emissions at the first sorbent introduction point 55 that is disposed between the furnace 47 and the ESP 48. Alternatively, as shown in FIG. 18B, the sorbent may be injected into the gaseous emissions at the second sorbent introduction point 56 that is disposed between the FDG unit 49 and the FF unit 50. The sorbent contains the amalgam forming metal such that the sorbent binds with at least some of the heavy metal contaminants in the gaseous emissions before the gaseous emissions enter the reverse venturi apparatus 15. By injecting the sorbent into the gaseous emissions at the first sorbent introduction point 55 or the second sorbent introduction point 56, more mercury, heavy metals, and acid gasses can be collected in the FF unit 50 at levels that were previously impossible to achieve. As noted above, the amalgam forming metal may be selected from a group consisting of zinc, iron, and aluminum and the sorbent may be, for example, a CZTS compound. The sorbent is able to be regenerated and rejuvenated so that the hazardous contaminants can be harvested and recycled.

Figure 19:
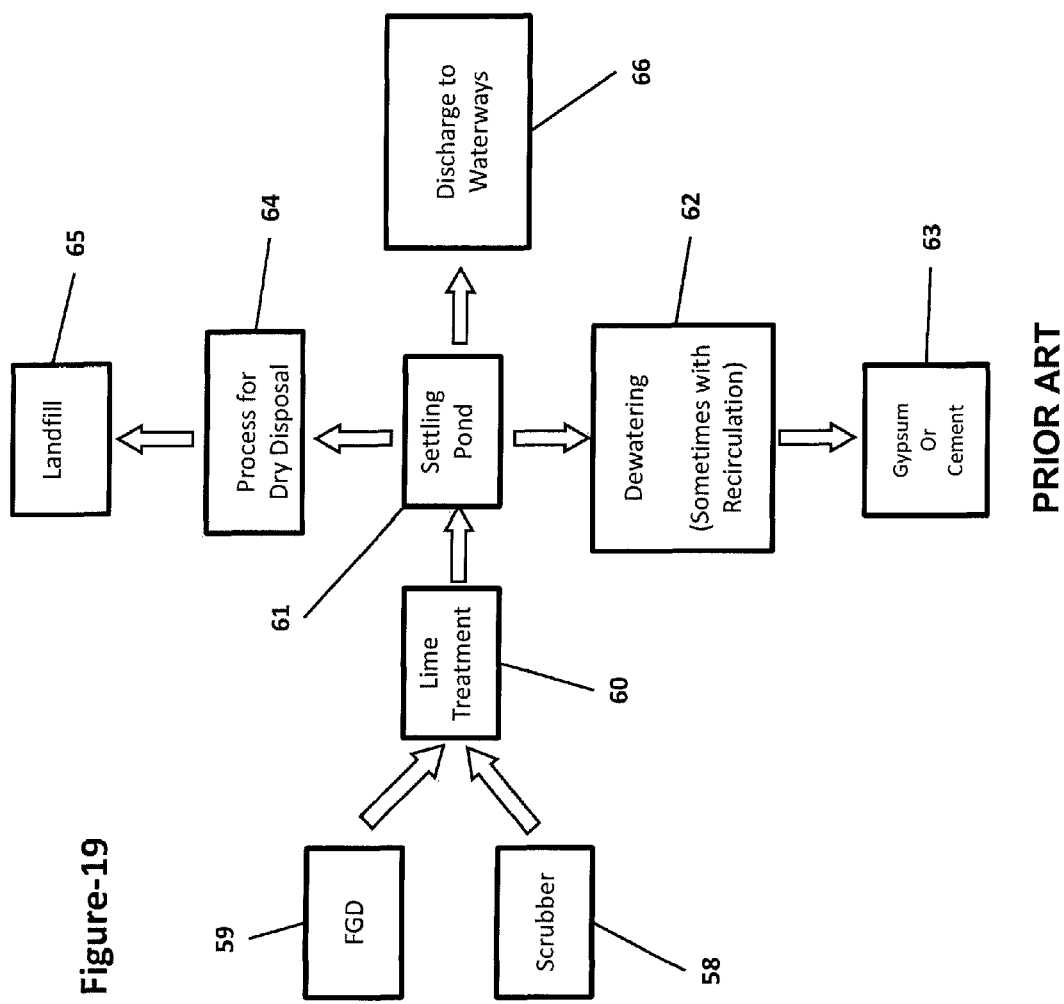
FIG. 19 is a block diagram illustrating a known method for removing contaminants from non-gaseous emissions that calls for depositing the non-gaseous emissions in a settling pond.

With reference to FIG. 19, a block diagram of a typical non-gaseous emission control system is shown. Liquid and/or liquid-like emissions can be routed from a fluidized gas desulfurization (FGD) unit 59 and/or routed from a wet scrubber unit 58 into a lime treatment station 60 before being routed to a settling pond 61. After an appropriate period of time, the non-gaseous emissions will be routed out of the settling ponds 61 into either a process system for dry disposal preparation 64 or to a dewatering system 62. The non-gaseous emissions that are routed through the process for dry disposal 64 are prepared for disposal in a landfill 65. The non-gaseous emissions that are routed through the dewatering system 62, which sometimes may include a recirculation system, are prepared for use in a secondary industrial process 63, which for example, may involve the manufacture of gypsum and/or cement. The non-gaseous emissions that are not routed out the settling ponds 61 into the dewatering systems 62 or into the processes for dry disposal 64 are routed for discharge into waterways 66. The final non-gaseous emissions released into the waterways 66 are not as regulated as they will be in coming years. The proposed EPA water emissions regulations and requirements will be extraordinarily restrictive compared to the emissions allowed into waterways at the present time. The industries with contaminated liquid emissions requiring discharge into waterways have current emissions control technology which has virtually no possibility of meeting and/or complying with the coming EPA regulations.

Figure 20:
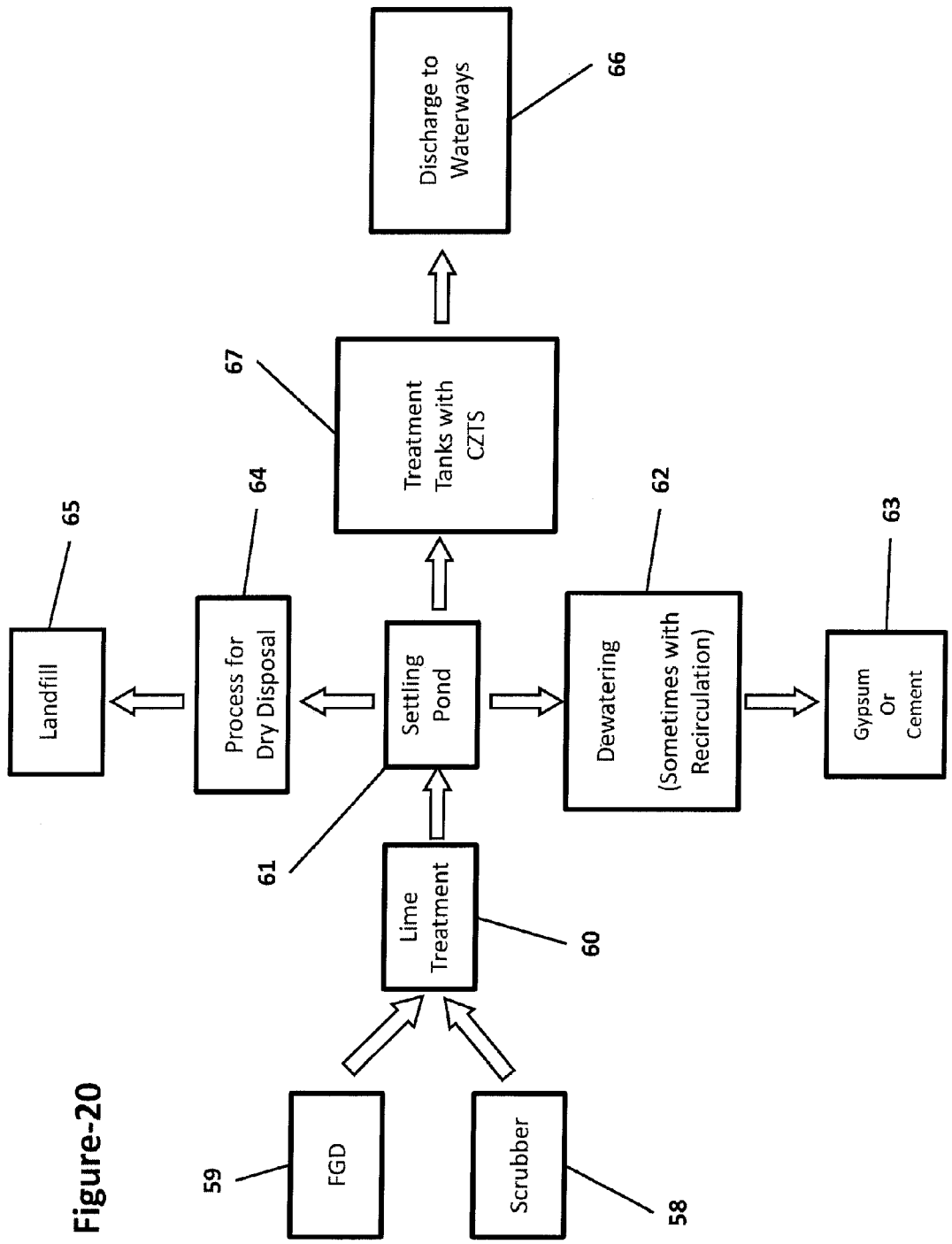
FIG. 20 is a block diagram illustrating the method for removing contaminants from non-gaseous emissions illustrated in FIG. 19 where the method has been modified by adding steps for treating a portion of the non-gaseous emissions extracted from the settling pond with a sorbent.

With reference to FIG. 20, the block diagram of FIG. 19 has been modified with one or more treatment tanks 67, which contain the sorbent described above. The treatment tanks 67 are located after the non-gaseous emissions are routed out of the settling pond 61 and before they are discharged into the waterways 66. The method illustrated by FIG. 20 includes the steps of collecting non-gaseous emissions that contain contaminants, passing the non-gaseous emissions through the FGD unit 59 and/or the wet scrubber 58 to remove some of the contaminants in the non-gaseous emissions, routing the non-gaseous emissions from the FGD unit 59 and/or the wet scrubber 58 to a lime treatment unit 60, and passing the non-gaseous emissions through the lime treatment unit 60 to soften the non-gaseous emissions through Clark's process. It should be understood that in operation, the lime treatment unit 60 removes certain ions (e.g. calcium (Ca) and magnesium (Mg)) from the non-gaseous emissions by precipitation. The method also includes the steps of routing the non-gaseous emissions from the lime treatment unit 60 to the settling pond 61 where some of the contaminants in the non-gaseous emissions are removed by sedimentation, dewatering a first portion of the non-gaseous emissions in the settling pond 61 and using the dewatered by-product in a secondary industrial process 63, and removing a second portion of the non-gaseous emissions from the settling pond 61 and subjecting the second portion of the non-gaseous emissions to a dry disposal process 64. In accordance with the step of dewatering the first portion of the non-gaseous emissions in the settling pond 61 and using the dewatered by-product in the secondary industrial process 63, dewatering process may include recirculation of the first portion of the non-gaseous emissions and the secondary industrial process 63 may involve, for example, the manufacture of gypsum or the manufacture of cement. In accordance with the step of removing the second portion of the non-gaseous emissions from the settling pond 61 and subjecting the second portion of the non-gaseous emissions to the dry disposal process 64, the dry disposal process 64 may include depositing the second portion of the non-gaseous emissions in the landfill 65.

In accordance with the subject disclosure, the method further includes the step of routing a third portion of the non-gaseous emissions in the settling pond 61 to the treatment tanks 67 containing the disclosed sorbent. The sorbent contains an amalgam forming metal that binds with heavy metal contaminants in the third portion of non-gaseous emissions. Accordingly, the sorbent traps the heavy metal contaminants in the treatment tanks 67 when the heavy metal contaminants bind with the sorbent and settle/precipitate out of the non-gaseous emissions. The method may then proceed with routing the non-gaseous emissions from the treatment tanks 67 to the waterway 66 for discharge. It should be appreciated that the design of the treatment tanks 67 may allow the continuous passage of the non-gaseous emissions (i.e. the wastewater stream) through the treatment tanks 67.

With respect to the sorbent of the subject disclosure, several exemplary embodiments are disclosed. These exemplary embodiments are just a few examples and do not represent an exhaustive list of potential variations on the theme.

As noted above, one exemplary sorbent is elemental zinc powder. Zinc powder is made from elemental zinc. Zinc can come in the form of powders or in the form of granules. One method that can be used to extend the effective life of the zinc powder and/or granules at elevated temperatures for some gaseous emission applications and reduce and/or prevent premature oxidation is to mix or coat the granules and/or powder with a solid acid such as sulfamic acid, citric acid, or other organic acids. The powder/acid mixture can be injected into gaseous emissions (e.g. flue gas streams) and/or placed in an appropriate exemplary embodiment of the reverse venturi apparatus 15.

Optimal particle size for the zinc powder ranges from 0.5 nanometers to 7,500 microns. In addition, it has been found that a powder mixture with a range of different size particles is beneficial, especially if the particle sizes range from 0.5 nanometers to 7,500 microns. Similarly, the optimal particle size for zinc granules ranges from 7,500 microns to 3.0 inches. In addition, it has been found that a granule mixture with a range of different size granules is beneficial, especially if the granule sizes range from 7,500 microns to 3.0 inches.

In another exemplary embodiment, the sorbent is CZTS, which has the elemental formula of $Cu_2ZnSnS_4$. CZTS may also being comprised of other phases of copper, zinc, tin, and sulfur, which are also beneficial. CZTS and/or the associated phases of copper, zinc, tin, and sulfur may be blended in stoichiometric proportions and then mechanochemical compounding may be performed in a mill. Further still, the CZTS may be blended with equal proportions of any one of several clays such as bentonite or zeolite and calcium hydroxide (CaOH). The optimal particle size for CZTS powder ranges from 0.5 nanometers to 7,500 microns. It has been found in testing and development that CZTS powder mixtures with a range of different size particles is beneficial, especially if the particle sizes ranges from 0.5 nanometers to 7,500 microns. In applications where specialized CZTS granules are preferred, the optimal granule size has been found to range from 7,500 microns to 3.0 inches. In addition, it has been found that CZTS granule mixtures with a range of different size granules is beneficial, especially if the size of the granules ranges from 7,500 microns to 3.0 inches.

For most contaminants, the CZTS is most efficient at the smallest particle size within the above stated ranges and when the highest amount of CZTS in the metallic phase is present. It should be appreciated that during the manufacture of CZTS, a complete transformation of the mixture of copper, zinc, tin, and sulfur to CZTS does not take place, but is a mixture of phases (e.g. danbaite ($CuZn_2$) and tin sulfide (SnS)).

In one exemplary manufacturing method for CZTS, copper, zinc, tin, and sulfur are added to a mill in no particular order. Milling is accomplished using either a ball mill or some type of attrition mill or a combination of milling equipment which in sequential combination achieve the desired particle size. Exemplary starting particle size ranges from 325 standard mesh screens to 100 standard mesh screens, where 1 standard mesh screen equals 7,500 microns. The received particles are further weighed in a predetermined molar ratio of copper:zinc:tin:sulfur=1.7:1.2:1.0:4.0. After confirming mesh size and molar ratio, the particles are mechanochemically compounded into CZTS and its other phases by milling. Milling time is controlled to achieve optimum properties for specific applications. It should also be appreciated that milling can be accomplished using a wet milling process by adding a suitable solvent such as glycol ether, ethylene glycol, ammonia, or other alcohols or by dry milling, which is performed in an inert gas atmosphere.

During the milling, intermittent sampling takes place to determine particle size using a particle size analyzer, and an SEM, XRD, or Raman to determine percent phase transformation. The mill ball size is important and has been shown in testing to be optimized with a ball-to-powder weight ratio (charge ratio) of at least 5:1. The milling balls are best made of steel, ceramic, zirconia or any other material which achieves the size and/or phase transformations without contaminating the final product. When wet milling is used, the CZTS is dried. The CZTS is then blended further using a ribbon blender, V-blender, or any other suitable blender in order to blend in equal portions of bentonite or zeolite and calcium hydroxide.

In accordance with the methods described above, the sorbent may be introduced into gaseous emissions where the gaseous emissions are at a temperature of approximately 750 degrees Fahrenheit or less. The sorbent may be introduced into the gaseous emissions by any one of several methods such as, but not limited to, injection, fluid beds, coated filters, and traps. The method of introduction can be chosen based on existing emissions control systems in the plant to facilitate retro-fitting. One convenient method may be where CZTS is injected into the gaseous emissions in place of activated carbon, where the same injection equipment may be used with or without modification.

In some applications, the treatment of gaseous emissions may be optimized when CZTS is blended with bentonite for effective contaminant removal. Alternatively, the treatment of non-gaseous emission application may be optimized when CZTS is blended with Zeolite. In addition to the specific material blended with CZTS, the proportions of the blend may be application specific in order to provide optimized contaminant removal capabilities.

As shown in FIGS. 18A-B, where CZTS is used to treat gaseous emissions, the fabric filter unit 50 should be placed downstream of the CZTS introduction point 55, 56 so that the fabric filter unit 50 captures sorbent particles and increases the contact time that the gaseous emissions have with the sorbent. Deposition of the sorbent on the fabric filters (i.e. bags) of the fabric filter unit 50 allows additional contact time between the gaseous emissions and the sorbent and allows the sorbent to be collected for subsequent reclamation. The small particle size of the sorbent allows the sorbent to be carried along in the flow of gaseous emissions stream like dust being carried by the wind. During the period of time that the sorbent is carried in the flow of gaseous emissions, the sorbent comes in contact with contaminants also traveling in the flow of gaseous emissions and thusly can chemically react with and bind to the sorbent. Upon reaching the fabric filter unit 50, the gaseous emissions continue to pass through the filters in the fabric filter unit 50 while the particles of combined sorbent and contaminants are sized too large to pass through the filters. When the CZTS particles are less than 10 microns, it may be necessary to pre-coat the filters in the fabric filter unit 50 with a larger size CZTS particle, activated carbon, talc, lime, or other appropriate substance so the smaller CZTS particles do not pass through the filters. Alternative, a lower micron size rated filter may be used in the fabric filter unit 50.

In other applications for non-gaseous emissions, CZTS may be introduced into the treatment tanks 67 illustrated in FIG. 20. In this configuration, the CZTS is optimally introduced into the treatment tanks 67 with good agitation for a period of time, then the non-gaseous emissions (e.g. wastewater) undergoes pH adjustment, flocculation, and filtering before discharge. Afterwards, the CZTS in the treatment tanks 67 can undergo a reclamation process where the contaminants are harvested away from the CZTS. Used CZTS can be reclaimed by either leaching mercury from the CZTS or by vacuum distillation. The harvested contaminants may then be re-used in other industries. The CZTS also provides the benefit of being able to reduce nitrate and nitride levels in the non-gaseous emissions.

The water discharge regulations established by the EPA, which become effective in 2016, are much more stringent than those for air. Some of the current EPA water regulation levels listed in nanograms/Liter (ng/L), micrograms/Liter (ug/L), and/or grams/Liter are: mercury @ 119 ng/L; arsenic (As) @ 8 ug/L; selenium (Se) @ 10 ug/L; nitrogen dioxide ($NO_2$) and nitrate ($NO_3$) @ 0.13 g/L. Other heavy metals such as lead (Pb) and cadmium (Cd) also have proposed EPA restrictive levels. In many existing plants, water with contamination levels above allowable discharge regulations are routed to holding ponds and/or other types of sludge holding reservoirs of one kind or another. CZTS can treat solids in holding ponds by the same methods as disclosed herein for treating non-gaseous emissions. Depending on the ionic form of the heavy metal, sludge composition, and/or pH, the contact time for the CZTS in the holding pond can be appropriately adjusted. Adequate pH adjustment, flocculation, and subsequent filtering will allow for normal discharge, disposal, and/or use in other industries, none of which was previously possible.

It should be appreciated that the sorbents disclosed herein do not contain any loose carbon, including the activated carbon currently used in the art. As a result, none of the metal sulfides produced as by-products of the disclosed methods are leachable. Therefore, these by-products have valuable industrial use in gypsum wallboard and cement applications. EPA leach testing on metal sulfides is well known and use in these products is well documented.

Although activated carbon may be used in some alternative configurations, the limited use of activated carbon in these variations does not allow for the activated carbon to escape into the emissions. For example, in one configuration, activated carbon may be embedded in the filters of the fabric filter unit 50. This activated carbon is not free to escape into the flow of gaseous emissions. Another limited use of activated carbon is possible where the activated carbon coats the CZTS in its crystalline form, producing CZTS with a thin layer of carbon on the order of 1.0 nanometer in thickness or less. This helps to encourage the capture of extraordinarily small metallic vapor particles of mercury. In a similar fashion, the CZTS crystalline form can be coated with a nanometer-like thin layer of zeolite or other coatings to specifically target a specific hazardous contaminant for specialized applications. Again, the activated carbon in this various is not free to escape into the flow of gaseous emissions.

Figure 21:
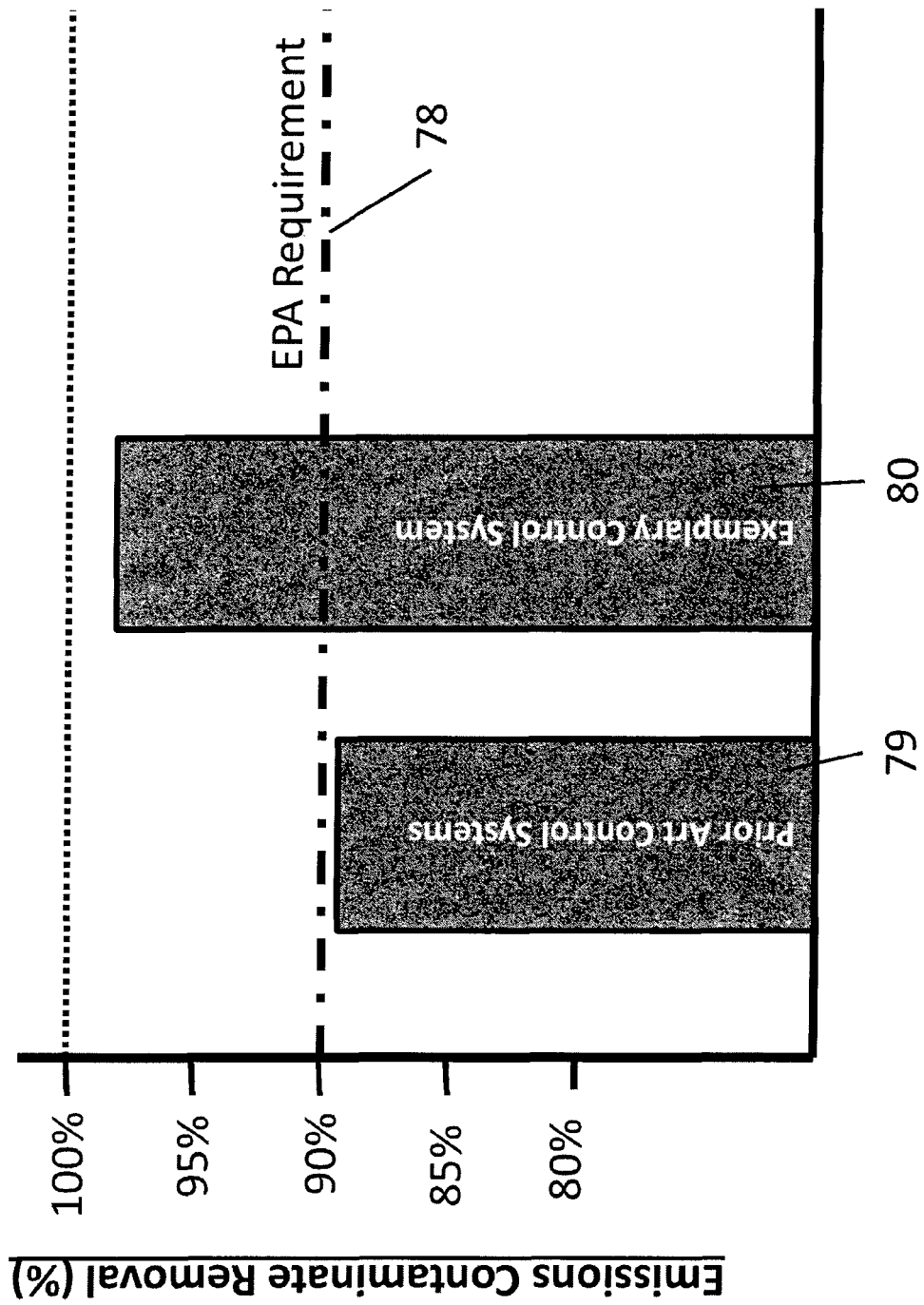
FIG. 21 is a graph illustrating the percentage of contaminants removed from emissions by known emissions control systems and the percentage of contaminants removed from emissions by the apparatus and methods disclosed herein.

Referring to FIG. 21, a graph illustrates the percentages of contaminants removed from emissions as a result of existing emissions control systems and the reverse venturi apparatus and the method disclosed herein. A 90% contaminant removal level 78 is currently established for gaseous emissions by the EPA. Existing emissions control systems 79 are effective to remove between 88%-90% of hazardous contaminants. However, the EPA has been raising the minimum percentage contaminant removal required over the years to the point that many existing emissions control systems are no longer able to meet the requirements and many other existing emissions control systems just meet the requirements while operating at their maximum removal capabilities available under the current technology.

Still referring to FIG. 21, the exemplary emissions control system 80 may either be a new emissions control system based upon the reverse venturi apparatus, the sorbents, and/or methods disclosed herein or it may be an existing emissions control system which has been modified and augmented to include the reverse venturi apparatus, the sorbents, and methods disclosed herein. Testing has confirmed that the exemplary emissions control system 80 is effective and capable of removing at least 98% of hazardous contaminants, which is well above the current EPA regulated levels.

It should be appreciated that although the steps of the methods are described and illustrated herein in a particular order, the steps may be performed in a different order without departing from the scope of the subject disclosure, except where the order of the steps is otherwise noted. In the same vein, it should be appreciated that the methods described and illustrated herein may be performed without the inclusion of all the steps described above or with the addition of intervening steps that have not been discussed, all without departing from the scope of the subject disclosure.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An apparatus for removing contaminants from emissions comprising:
a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;
said entry portion, said exit portion, and said enlarged portion of said housing being arranged in fluid communication with each other;
said entry portion of said housing having an entry portion cross-sectional area;
said exit portion of said housing having an exit portion cross-sectional area;
said enlarged portion of said housing having an enlarged portion cross-sectional area that is larger than said entry portion cross-sectional area and that is larger than said exit portion cross-sectional area;
a mass of reactive material disposed within said enlarged portion of said housing;
said mass of reactive material having a reactive outer surface disposed in contact with the emissions; and
said mass of reactive material containing an amalgam forming metal at said reactive outer surface that chemically binds at least some of the contaminants in the emissions that are passing through said enlarged portion of said housing to said reactive outer surface of said mass of reactive material,
wherein said mass of reactive material forms at least one obstruction element disposed within said enlarged portion of said housing that creates a tortuous flow path for the emissions passing through said enlarged portion of said housing.

2. The apparatus as set forth in claim 1 wherein said enlarged portion cross-sectional area is sized to create a dwell time ranging from 1 to 2.5 seconds for the emissions passing through said enlarged portion of said housing.

3. The apparatus as set forth in claim 2 wherein said enlarged portion cross-sectional area ranges from 3 to 330 square feet.

4. The apparatus as set forth in claim 1 wherein said at least one obstruction is a plurality of fragments that are contained in said enlarged portion of said housing.

5. The apparatus as set forth in claim 4 wherein said plurality of fragments are made of mossy zinc.

6. The apparatus as set forth in claim 1 wherein said at least one obstruction element is a combination of a plurality of baffles and a plurality of fragments that are both disposed in said enlarged portion of said housing, said plurality of baffles extending transversely across said enlarged portion of said housing, said plurality of baffles being spaced apart relative to one another, each of said plurality of baffles including orifices that permit flow of the emissions therethrough, said plurality of fragments having different sizes, and said plurality of fragments being grouped by similar size and separated from fragments of another size by said plurality of baffles.

7. The apparatus as set forth in claim 6 wherein said size of said fragments decreases moving away from said entry portion of said housing and toward said exit portion of said housing.

8. The apparatus as set forth in claim 1 wherein said at least one obstruction element is a series of staggered baffles extending within said enlarged portion of said housing such that said series of staggered baffles give said tortuous flow path a serpentine shape.

9. The apparatus as set forth in claim 1 wherein said at least one obstruction element is an auger-shaped baffle that extends helically within said enlarged portion of said housing such that said auger-shaped baffle gives said tortuous flow path a spiral shape.

10. The apparatus as set forth in claim 1 wherein said at least one obstruction element is a baffle extending transversely across said enlarged portion of said housing, said baffle including orifices that permit flow of the emissions through said baffle.

11. The apparatus as set forth in claim 1 wherein said at least one obstruction element is a plurality of entangled strands that are disposed in said enlarged portion of said housing.

12. The apparatus as set forth in claim 1 wherein said at least one obstruction element is a plurality of crystalline flakes that are contained in said enlarged portion of said housing.

13. The apparatus as set forth in claim 1 wherein said at least one obstruction element is a plurality of wire coils disposed in said enlarged portion of said housing.

14. The apparatus as set forth in claim 1 wherein said at least one obstruction element is a filter element extending transversely across said enlarged portion of said housing, said filter element being porous to allow flow of the emissions through said filter element.

15. The apparatus as set forth in claim 1 wherein said housing is made from a material that is different from said mass of reactive material.

16. An apparatus for removing contaminants from emissions comprising:
a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;
said entry portion, said exit portion, and said enlarged portion of said housing being arranged in fluid communication with each other;
said entry portion of said housing having an entry portion cross-sectional area;
said exit portion of said housing having an exit portion cross-sectional area;
said enlarged portion of said housing having an enlarged portion cross-sectional area that is larger than said entry portion cross-sectional area and that is larger than said exit portion cross-sectional area;
a mass of reactive material disposed within said enlarged portion of said housing;
said mass of reactive material having a reactive outer surface disposed in contact with the emissions;
said mass of reactive material containing an amalgam forming metal at said reactive outer surface that chemically binds at least some of the contaminants in the emissions that are passing through said enlarged portion of said housing to said reactive outer surface of said mass of reactive material; and
a sorbent injector disposed upstream of said enlarged portion of said housing that adds a sorbent into the emissions, said sorbent containing said amalgam forming metal such that said sorbent binds with at least some of the contaminants in the emissions before the emissions enter said enlarged portion of said housing.

17. The apparatus as set forth in claim 16 wherein said sorbent is a zinc powder.

18. The apparatus as set forth in claim 16 wherein said sorbent is a copper, zinc, tin, sulfide (CZTS) compound.

19. An apparatus for removing contaminants from emissions comprising:
a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;
said entry portion, said exit portion, and said enlarged portion of said housing being arranged in fluid communication with each other;
said entry portion of said housing having an entry portion cross-sectional area;
said exit portion of said housing having an exit portion cross-sectional area;
said enlarged portion of said housing having an enlarged portion cross-sectional area that is larger than said entry portion cross-sectional area and that is larger than said exit portion cross-sectional area;
a mass of reactive material disposed within said enlarged portion of said housing;
said mass of reactive material having a reactive outer surface disposed in contact with the emissions; and
said mass of reactive material containing an amalgam forming metal at said reactive outer surface that chemically binds at least some of the contaminants in the emissions that are passing through said enlarged portion of said housing to said reactive outer surface of said mass of reactive material,
wherein said enlarged portion of said housing includes an interior surface and wherein said mass of reactive material coats said interior surface of said enlarged portion of said housing.

20. An apparatus for removing contaminants from emissions comprising:
a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;
said entry portion, said exit portion, and said enlarged portion of said housing being arranged in fluid communication with each other;
said entry portion of said housing having an entry portion cross-sectional area;
said exit portion of said housing having an exit portion cross-sectional area;
said enlarged portion of said housing having an enlarged portion cross-sectional area that is larger than said entry portion cross-sectional area and that is larger than said exit portion cross-sectional area;

a mass of reactive material disposed within said enlarged portion of said housing;

said mass of reactive material having a reactive outer surface disposed in contact with the emissions; and said mass of reactive material containing an amalgam forming metal at said reactive outer surface that chemically binds at least some of the contaminants in the emissions that are passing through said enlarged portion of said housing to said reactive outer surface of said mass of reactive material, wherein said amalgam forming metal is zinc.

21. An apparatus for removing contaminants from emissions comprising:

a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;

said entry portion, said exit portion, and said enlarged portion of said housing being arranged in fluid communication with each other;

said entry portion of said housing having an entry portion cross-sectional area;

said exit portion of said housing having an exit portion cross-sectional area;

said enlarged portion of said housing having an enlarged portion cross-sectional area that is larger than said entry portion cross-sectional area and that is larger than said exit portion cross-sectional area;

a mass of reactive material disposed within said enlarged portion of said housing;

said mass of reactive material having a reactive outer surface disposed in contact with the emissions; and said mass of reactive material containing an amalgam forming metal at said reactive outer surface that chemically binds at least some of the contaminants in the emissions that are passing through said enlarged portion of said housing to said reactive outer surface of said mass of reactive material, wherein said amalgam forming metal is selected from a group consisting of zinc, iron, and aluminum.

22. An apparatus for removing contaminants from emissions comprising:

a housing shaped as a reverse venturi, said housing including an entry portion for receiving the emissions at a pre-determined entry flow rate, an exit portion for expelling the emissions at a pre-determined exit flow rate, and an enlarged portion disposed between said entry portion and said exit portion of said housing for trapping the contaminants in the emissions;

said entry portion, said exit portion, and said enlarged portion of said housing being arranged in fluid communication with each other;

said entry portion of said housing having an entry portion cross-sectional area;

said exit portion of said housing having an exit portion cross-sectional area;

said enlarged portion of said housing having an enlarged portion cross-sectional area that is larger than said entry portion cross-sectional area and that is larger than said exit portion cross-sectional area;

a mass of reactive material disposed within said enlarged portion of said housing;

said mass of reactive material having a reactive outer surface disposed in contact with the emissions;

said mass of reactive material containing an amalgam forming metal at said reactive outer surface that chemically binds at least some of the contaminants in the emissions that are passing through said enlarged portion of said housing to said reactive outer surface of said mass of reactive material; and at least one spray nozzle disposed in fluid communication with said enlarged portion of said housing and positioned to spray a deoxidizing acid over said mass of reactive material wherein said deoxidizing acid washes said mass of reactive material of the contaminants to rejuvenate said mass of reactive material.

23. An emissions control method comprising the steps of:

burning a fuel in a furnace to generate gaseous emissions that contain particulate, sulfur dioxide, and heavy metal contaminants;

passing the gaseous emissions through an electrostatic precipitator and removing a first portion of the particulate contaminants from the gaseous emissions;

passing the gaseous emissions through a fluidized gas desulfurization unit and removing the sulfur dioxide contaminants from the gaseous emissions;

passing the gaseous emissions through a fabric filter unit and removing a second portion of the particulate contaminants from the gaseous emissions;

passing the gaseous emissions through a reverse venturi apparatus to remove the heavy metal contaminants from the gaseous emissions by passing the gaseous emissions by a mass of reactive material disposed in the reverse venturi apparatus wherein the mass of reactive material contains an amalgam forming metal that chemically binds with the heavy metal contaminants in the gaseous emissions and that traps the heavy metal contaminants in the reverse venturi apparatus; and routing the gaseous emissions to a stack that vents the gaseous emissions to a surrounding atmosphere.

24. The method as set forth in claim 23 further comprising the step of:

injecting a sorbent into the gaseous emissions at a sorbent introduction point disposed between the furnace and the electrostatic precipitator, the sorbent containing the amalgam forming metal such that the sorbent chemically binds with at least some of the heavy metal contaminants in the gaseous emissions before the gaseous emissions enter the reverse venturi apparatus.

25. The method as set forth in claim 24 wherein the sorbent is a copper, zinc, tin, sulfide (CZTS) compound.

26. The method as set forth in claim 23 further comprising the step of:

injecting a sorbent into the gaseous emissions at a sorbent introduction point disposed between the fluidized gas desulfurization unit and the fabric filter unit, the sorbent containing the amalgam forming metal such that the sorbent chemically binds with at least some of the heavy metal contaminants in the gaseous emissions before the gaseous emissions enter the reverse venturi apparatus.

27. The method as set forth in claim 26 wherein the sorbent is a copper, zinc, tin, sulfide (CZTS) compound.

28. The method as set forth in claim 23 wherein the amalgam forming metal is zinc.

29. An emissions control method comprising the steps of:
- depositing non-gaseous emissions that contain contaminants in a settling pond where some of the contaminants in the non-gaseous emissions are removed by sedimentation;
- dewatering a first portion of the non-gaseous emissions in the settling pond;
- removing a second portion of the non-gaseous emissions from the settling pond and subjecting the second portion of the non-gaseous emissions to a dry disposal process;
- routing a third portion of the non-gaseous emissions in the settling pond to a treatment tank containing a sorbent, said sorbent containing an amalgam forming metal that chemically binds with heavy metal contaminants in the third portion of non-gaseous emissions and that traps the heavy metal contaminants in the treatment tank; and
- routing the non-gaseous emissions away from the treatment tank for discharge.

30. The method as set forth in claim 29 wherein the sorbent is a copper, zinc, tin, sulfide (CZTS) compound.

31. The method as set forth in claim 29 further comprising the step of:
- passing the non-gaseous emissions through at least one of a fluidized gas desulfurization unit and a wet scrubber to remove some of the contaminants in the non-gaseous emissions.

32. The method as set forth in claim 29 further comprising the step of:
- passing the non-gaseous emissions through a lime treatment unit to soften the non-gaseous emissions through Clark's process.

* * * * *

UNITED STATES PATENT AND TRADEMARK OFFICE
CERTIFICATE OF CORRECTION

PATENT NO. : 9,675,933 B2
APPLICATION NO. : 14/808563
DATED : June 13, 2017
INVENTOR(S) : Hal Stuhler It is certified that error appears in the above-identified patent and that said Letters Patent is hereby corrected as shown below:

In the Specification

| | | |
|---|---|---|
| Column 3, Background | Line 53 | Delete "(SO2)" and insert --($SO_2$)-- therefor |
| Column 16, Detailed Description | Line 41 | Delete "18" and insert --19-- therefor |
| Column 16, Detailed Description | Line 45 | Delete "18" and insert --19-- therefor |
| Column 16, Detailed Description | Line 46 | Delete "18" and insert --19-- therefor |
| Column 17, Detailed Description | Line 5 | Delete "68," and insert --21,-- therefor |
| Column 25, Detailed Description | Line 58 | Delete "induction" and insert --introduction-- therefor |
| Column 30, Detailed Description | Line 55 | Delete "(ug/L)," and insert --(μg/L),-- therefor |

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,675,933 B2

| Column 30, Detailed Description | Line 56 | Delete "ug/L;" and insert --µg/L;-- therefor |

| Column 30, Detailed Description | Line 56 | Delete "ug/L;" and insert --µg/L;-- therefor |